United States Patent [19]

Hanawa et al.

[11] Patent Number: 5,381,531
[45] Date of Patent: Jan. 10, 1995

[54] DATA PROCESSOR FOR SELECTIVE SIMULTANEOUS EXECUTION OF A DELAY SLOT INSTRUCTION AND A SECOND SUBSEQUENT INSTRUCTION THE PAIR FOLLOWING A CONDITIONAL BRANCH INSTRUCTION

[75] Inventors: Makoto Hanawa, Kodaira; Tadahiko Nishimukai, Sagamihara; Makoto Suzuki, Niiza; Katsuhiro Shimohigashi, Musashimurayama, all of Japan

[73] Assignee: Hitachi, Ltd., Tokyo, Japan

[21] Appl. No.: 727,581

[22] Filed: Jul. 9, 1991

[30] Foreign Application Priority Data

Aug. 15, 1990 [JP] Japan .................... 2-214260

[51] Int. Cl.⁶ .............................. G06F 9/38
[52] U.S. Cl. .................... 395/375; 364/261.5;
364/229.2; 364/938.1; 364/948.3; 364/DIG. 1;
395/800
[58] Field of Search ..................... 395/375, 800

[56] References Cited

U.S. PATENT DOCUMENTS

| 3,718,912 | 2/1983 | Hasbrouck et al. | |
|---|---|---|---|
| 4,847,748 | 7/1989 | Yamahata et al. | 395/375 |
| 4,858,105 | 8/1989 | Kuriyama et al. | 395/375 |
| 4,928,226 | 5/1990 | Kamada et al. | 395/375 |
| 4,942,525 | 7/1990 | Shintani et al. | 395/375 |
| 5,051,896 | 9/1991 | Lee et al. | 395/375 |
| 5,072,364 | 12/1991 | Jardine et al. | 395/375 |
| 5,185,868 | 2/1993 | Tran | 395/375 |
| 5,233,694 | 8/1993 | Hotta et al. | 395/375 |
| 5,269,007 | 12/1993 | Hanawa et al. | 395/375 |

FOREIGN PATENT DOCUMENTS

0354740A3 2/1990 European Pat. Off.
0368332A2 5/1990 European Pat. Off.
0437044A2 7/1991 European Pat. Off.

OTHER PUBLICATIONS

Miller, R. E., et al. "Floating-Duplex Decode and Execution of Instruction," IBM Technical Disclosure Bulletin, vol. 23, No. 1, Jun. 1980, pp. 409–412 (English).
"Machine Which Reduces Delay Penalties due to Data Dependencies and Interlocks to Achieve High Performance," IBM Technical Disclosure Bulletin, vol. 27, No. 10A, Mar. 1985 (one page) (English).

Primary Examiner—Ken S. Kim
Attorney, Agent, or Firm—Fay, Sharpe, Beall, Fagan, Minnich & McKee

[57] ABSTRACT

An instruction fetch unit (640) of a data processor (610) capable of simultaneous execution of two instructions fetches a first and a second instruction from a memory (620) in one cycle. The first and the second instruction thus fetched are set in a first and a second register (641, 642) before being decoded in a first and a second instruction decoder (644, 645). Comparators (131, 132) compares data on the destination field of the first instruction with data on the source field of the second instruction. When both the data are inconsistent, a parallel operation control unit (646) permits the first and the second instruction execution unit (651, 652) under the first and the second instruction to execute the two instructions in response to the outputs of the comparators (131, 132). When both the data are consistent, the parallel operation control unit (646) inhibits the parallel execution.

9 Claims, 16 Drawing Sheets

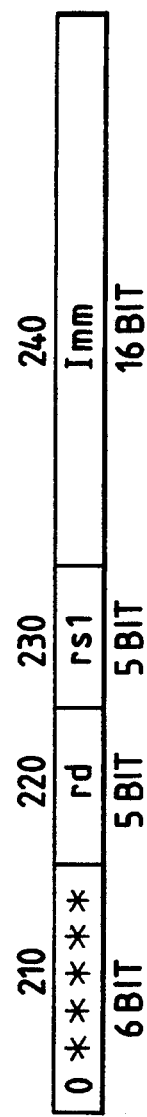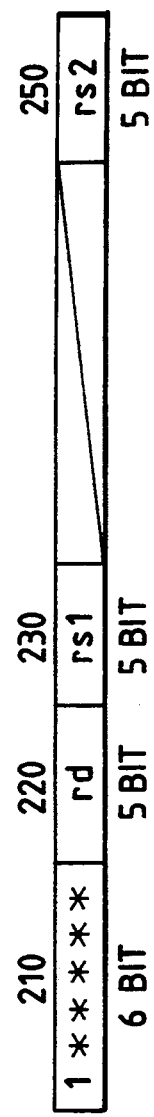
FIG. 2(A)
FIG. 2(B)

PROGRAM MEMORY

FIG. 5

| OP CODE | INSTRUCTION MNEMONIC | OP CODE | INSTRUCTION MNEMONIC | CLASSIFICATION |
|---|---|---|---|---|
| 0 0 0 0 0 0 | LUI (510) | | | |
| 0 0 0 0 0 1 | ADDI (512) | 1 0 0 0 0 1 | ADD (552) | ARITHMETIC INSTRUCTION |
| 0 0 0 0 1 0 | SUBI (514) | 1 0 0 0 1 0 | SUB (554) | |
| 0 0 0 0 1 1 | ANDI (516) | 1 0 0 0 1 1 | AND (556) | |
| 0 0 0 1 0 0 | ORI (518) | 1 0 0 1 0 0 | OR (558) | |
| 0 0 0 1 0 1 | EORI (520) | 1 0 0 1 0 1 | EOR (560) | |
| 0 0 0 1 1 0 | SLLI (522) | 1 0 0 1 1 0 | SLL (562) | |
| 0 0 0 1 1 1 | SRLI (524) | 1 0 0 1 1 1 | SRL (564) | |
| 0 0 1 0 0 0 | SRAI (526) | 1 0 1 0 0 0 | SRA (566) | |
| 0 0 1 0 0 1 | LD (530) | | | MEMORY-OPERATION INSTRUCTION |
| 0 0 1 0 1 0 | ST (532) | | | |
| 0 0 1 0 1 1 | Bcc (536) | 1 0 1 0 1 1 | JUMP (576) | BRANCH INSTRUCTION |

DATA PROCESSOR FOR SELECTIVE SIMULTANEOUS EXECUTION OF A DELAY SLOT INSTRUCTION AND A SECOND SUBSEQUENT INSTRUCTION THE PAIR FOLLOWING A CONDITIONAL BRANCH INSTRUCTION

BACKGROUND OF THE INVENTION

1. Field of the Invention

The present invention relates to a data processor and more particularly to a microprocessor for a 32-bit reduced instruction set computer.

2. Description of the Prior Art

A detailed description has already been given of a reduced instruction set computer (hereinafter called 'RISC') capable of executing instructions at high speed in Japanese Patent Laid-Open No. 49843/1988 as a priority claim of U.S. Ser. No. 896,156 filed by IBM of the United States on Aug. 18, 1986.

A complex instruction set computer (hereinafter called 'CISC') microprocessor tends to become complicated in hardware as the hardware-to-software transfer of its function escalates. On the other hand, the RISC microprocessor tends to become so architectured as to perform uncomplicated functions to increase the processing speed.

As the RISC, there is also a known primitive instruction set computing machine system (hereinafter called 'PRISM') for directly executing a primitive instruction set using its hardware in order to execute all the primitive instructions in one machine cycle.

On the other hand, the tendency is for the mainstream of microprocessor architecture to increasingly change in such a manner that the CISC is replaced with the RISC because the improvement speed in performance of the latter is faster than that of the former.

In some recent high-performance RISC microprocessor, a fixed length instruction, 32 bits in fixed length, has been adopted and this fixed length instruction can be executed in one machine cycle.

On the other hand, 'IEEE International Solid-State Circuits Conference DIGEST OF TECHNICAL PAPERS, pp 54–55, 1989' disclose microprocessors developed by Intel of the United States in which the processing performance has been improved by expanding the bandwidth of the bus, a data width on an external bus connected to the memory being 64 bits. In other words, two 32-bit instructions are fetched by the microprocessor from the memory via the external 64-bit data bus in one cycle and the two instructions can simultaneously be executed when they are an integer instruction and a floating-point instruction. The integer and the floating-point instruction may simultaneously be executed by an integer unit and a floating-point unit in parallel.

The RISC processor disclosed in Japanese Patent Laid-Open No. 49843/1988 has the function of simultaneously executing two instructions. This processor is equipped with a first and a second execution unit, a first and a second instruction decode unit, an instruction buffer for fetching instructions from a memory and feeding the instructions to the first and the second instruction decode unit, a register file and the like. On receiving outputs from the register file, the first and the second execution unit are capable of simultaneously performing processes in parallel.

Japanese Patent Laid-Open No. 49843/1988 also discloses special status where two parallel instructions are non-executable simultaneously ((1) when the second instruction of the two parallel instructions needs the result of the first instruction, (2) when the two parallel instructions belong to the same category of instructions, (3) when one of the parallel instructions needs more cycles than the other, (4) when one of the parallel instructions needs both execution units, and (5) when the destination registers of the two parallel instructions are the same and when it is needed to prevent the two instructions from being executed disorderly by canceling one of the instructions), and further discloses countermeasures to be taken in the status described above (in the cases of (1), (2), code scheduling by a compiler should be used to deal with them. As the RISC processor has such primitive instructions and there are only a few instructions requiring a plurality of cycles, the cases of (3), (4) occur unfrequently. Moreover, exception processing hardware should be used to deal with the status (5)).

SUMMARY OF THE INVENTION

The present inventors have studied the prior art and found that it has some problems.

More specifically, as the integer unit and the floating-point unit are controlled by the integer instruction and the floating-point instruction, respectively, it has been utilized that no conflict occurs therebetween in the architecture disclosed in the technical papers described above. However, the problem is that the architecture is not applicable to the system for simultaneously executing two of the arithmetic instructions dealing with integers.

The system disclosed in Japanese Patent Laid-Open No. 49843/1988, which compels the compiler to perform an excessive instruction code scheduling process, poses a problem in that restrictions are placed on the preparation of software.

In the system disclosed in the published publication stated above, as the compiler is used to do instruction code scheduling, the program prepared for conventional hardware for serially executing a plurality of instructions needs converting for parallel execution hardware. The problem is that this program is not compatible with the conventional program.

An object of the present invention is to provide a data processor capable of simultaneously executing two arithmetic instructions dealing with numeric values.

Another object of the present invention is to provide a data processor having hardware capable of alleviating an instruction scheduling burden to a compiler.

Still another object of the present invention is to provide a data processor which has program compatibility with conventional serial execution hardware and is capable, of parallel execution.

A general description will subsequently be given of a microprocessor in a representative embodiment of the present invention disclosed in the present application.

The microprocessor according to the present invention comprises:

(1) an instruction fetch unit 640 for fetching a first and a second instruction having an instruction length with a predetermined bit width (32 bits) from a memory and for outputting the first and the second instruction in parallel;

(2) a first instruction decoder 644 whose input is supplied with the first instruction output from the instruction fetch unit 640;

(3) a second instruction decoder 645 whose input is supplied with the second instruction output from the instruction fetch unit 640;

(4) a first instruction execution unit 651 to be controlled according to the result of decoding in the first instruction decoder 644;

(5) a second instruction execution unit 652 to be controlled according to the result of decoding in the second instruction decoder 645; and (6) comparators 131, 132 for comparing data on the destination field of the first instruction output from the instruction fetch unit 640 with data on the source field of the second instruction output from the instruction fetch unit 640.

When the data on the destination field of the first instruction output from the instruction fetch unit 640 conforms to the data on the source field of the second instruction output from the instruction fetch unit 640, the outputs of the comparators 131, 132 inhibit the parallel execution of the first and the second instruction in the first and the second instruction execution unit 651, 652.

The first and the second instruction are fetched by the instruction fetch unit 640 from a memory 620 in one cycle, and the first and the second instruction thus fetched are decoded in the first and the second decoder 644, 645.

The instruction execution units 651, 652 are controlled according to the results of decoding obtained from the first and the second decoders 644, 645.

When the data on the destination field of the first instruction outpost from the instruction fetch unit 640 differs from the data on the source field of the second instruction output from the instruction fetch unit 640, the first and the second instruction may be executed in parallel. As a result, the outputs of the comparators 131, 132 permit the parallel execution of the first and the second instruction in the first and the second instruction execution unit 651, 652.

On the other hand, when the data on the destination field of the first instruction output from the instruction fetch unit 640 conforms to the data on the source field of the second instruction output from the instruction fetch unit 640, the first and the second instruction may not be executed in parallel. Consequently, the outputs of the comparators 131, 132 inhibit the parallel execution of the first and the second instruction in the first and the second instruction execution unit 651, 652.

These and other objects, and features of the present invention will become apparent from the following description elf embodiments with reference to the accompanying drawings.

BRIEF DESCRIPTION OF THE DRAWINGS

FIGS. 2(a) and 2(b) each illustrate different instruction formats for the data processor of FIG. 1

FIG. 5 is a table of allocated instruction codes of the data processor of FIG. 1.

DESCRIPTION OF THE PREFERRED EMBODIMENTS

A detailed description will subsequently be given of embodiments of the present invention with reference to the accompanying drawings.

General Description of Data Processor

Figure 1:
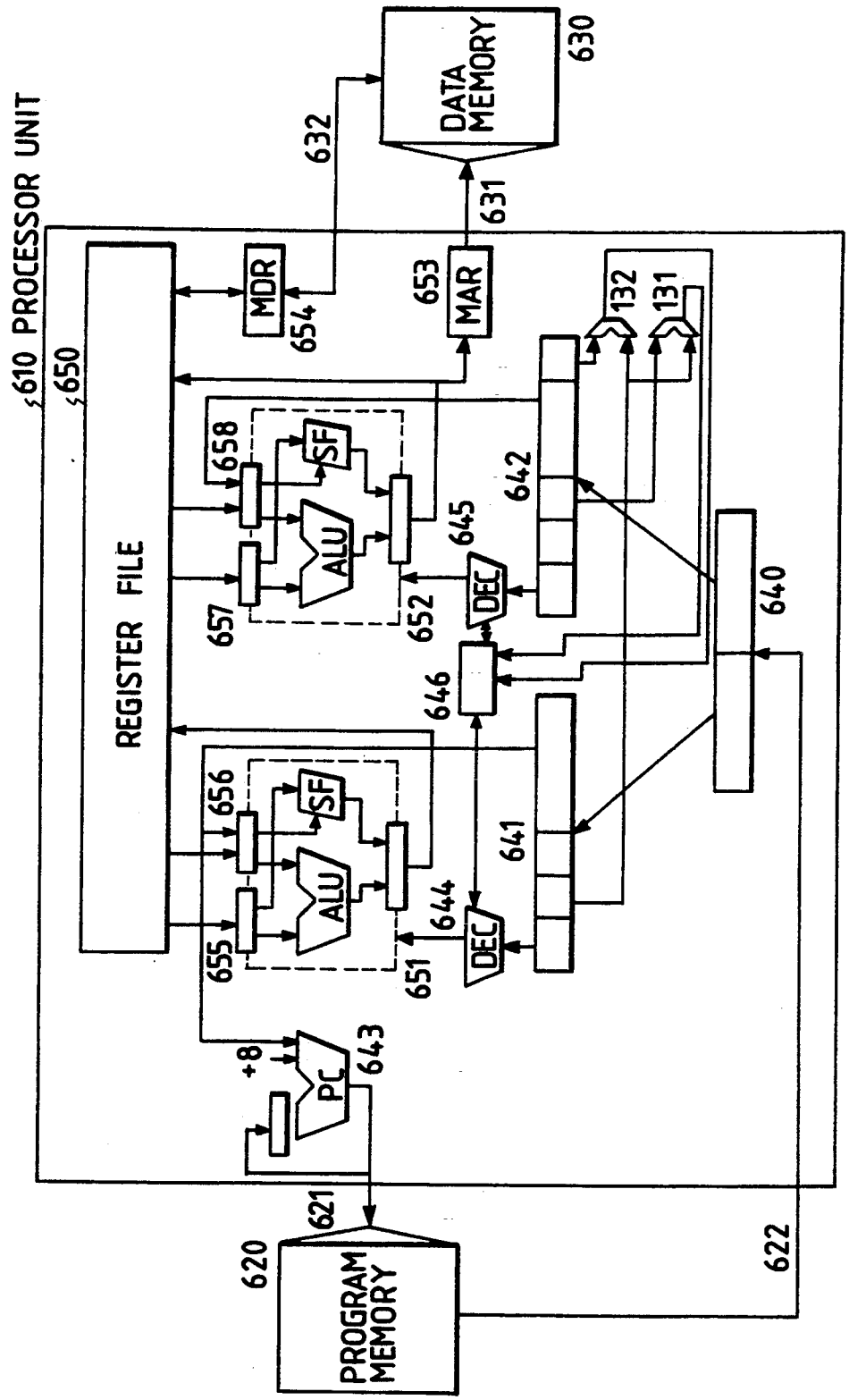
FIG. 1 is a block diagram showing a system configuration of a data processor embodying the present invention.

FIG. 1 is a block diagram of a data processor embodying the present invention. In general, the data processor consists; of a processor unit 610, a program memory 620, and a data memory 630.

The program memory 620 is connected via an instruction address bus 621 and an instruction data bus 622 to the processor 610.

The instruction address bus 621 is 32 bits in width and used for addressing up to 4G (giga) bytes.

The instruction data bus 622 is 64 bits in width and used for two instructions to be simultaneously fetched from the program memory 620 each time the instruction is transferred.

A data memory 630 is connected via an operand address bus 631 and an operand data bus 632 to the processor 610.

The operand address bus 631 is 32 bits in width and used for addressing up to 4G (giga) bytes.

The operand data bus 632 is 32 bits in width and used for one-word data to be fetched from or stored in the data memory 630 each time.

Moreover, the program memory 620 and the data memory 630 are, for instance, an instruction cache memory and a data cache memory for used in holding copies of parts of the instructions and the data of a main memory (not shown).

Internal Configuration of Processor

The processor 610 comprises a program counter 643 for making instruction address calculation, a prefetch buffer 640 lot holding the instruction prefetched, a first instruction register 641, a second instruction register 642, a first instruction decoder 644, a second instruction decoder 645, a register file 650, a first arithmetic logic unit 651, a second arithmetic logic unit 652, a memory address register (MAR) 653, a memory data register (MDR) 654, and a parallel operation control unit 646.

Prefetch Unit

The prefetch buffer 640 as a prefetch unit is 64 bits in width and capable of holding two instructions fetched from the program memory 620 at a time.

The contents of the prefetch buffer 640 are transferred to the first instruction register 641 and the second instruction register 642 at a point of time free spaces are found therein in such a way that a left-hand and a right-hand instruction are transferred to the first and the second instruction register 641, 642, respectively.

As big endian addressing is employed in this embodiment, the left-hand one of the two instructions held in the prefetch buffer 640 is young and therefore executed first and the right-hand one is executed subsequently.

Register File

The register file 650 is composed of 32 registers R0, R1, R2, ... R31 each having 32 bits in width, and 5-port reading and 3-port writing are possible simultaneously.

Instruction Decoder

The first and the second instruction fetched from the program memory 620 to the instruction fetch buffer 640 in one cycle are decoded by the first and the second decoder 644, 645, respectively.

According to the results of decoding in the first and the second decoder 644, 645, instruction execution units 651, 652 are controlled.

Instruction Execution Unit

The arithmetic logic units 651, 652 in the instruction execution units respectively have 32-bit A-side inputs 655, 657 and B-side inputs 656, 658, ALUs for performing arithmetic operations (arithmetic logic operations) on the respective inputs, and barrel shifters SFs for shifting the B-side inputs 565, 658 by the digits of the A-side inputs 655, 657.

Comparator

When data on the destination field of the first instruction output from the instruction prefetch buffer 640 differs from data on the source field of the second instruction output from the instruction prefetch buffer 640, the first and the second instruction can be executed in parallel. In response to the data on the destination field of the first instruction and that on the source field of the second instruction, the outputs of comparators 131, 132 permit the parallel execution of the first and the second instruction in the first and the second instruction execution unit 651, 652.

When the data on the destination field of the first instruction output from the instruction prefetch buffer 640 conforms to the data on the source field of the second instruction output from the instruction prefetch buffer 640, the first and the second instruction may not be executed in parallel. In response to the data on the destination fiend of the first instruction and that on the source field of the second instruction, the outputs of comparators 131, 132 inhibit the parallel execution of the first and the second instruction in the first and the second instruction execution unit 651, 652.

Parallel Operation Control Unit

The parallel operation control unit 646 receives the data such as the outputs of the comparators 131, 132 as a result of decoding in the first and the second instruction decoder 644, 645 and decides whether the two instructions set in the first and the second instruction register 641, 642 are simultaneously executable.

When the two instructions are simultaneously executable, the results of decoding in the first and the second instruction decoder 644, 645 are made effective and the two instructions are executed in the first and the second instruction execution unit 651, 652.

When the two instructions are non-executable simultaneously, while the result of decoding in the second instruction decoder 645 is nullified, only that of decoding in the first instruction decoder 644 is made effective and the two instructions are serially executed.

(1) When the first and the second instruction are both arithmetic instructions, (2) when the first and the second instruction are a branch instruction and the arithmetic instruction, respectively, (3) when the first and the second instruction are the arithmetic instruction and a memory-operation instruction, respectively, and (4) when the first and the second instruction are the branch instruction and the memory-operation instruction, respectively, with respect to the two instructions simultaneously fetched by the instruction prefetch buffer 640, the two instructions are simultaneously executable in principle.

(5) When the first and the second instruction are both the branch instructions, and (6) when the first and the second instruction are both the memory-operation instructions, however, the hardware stated above is usable for inhibiting the simultaneous execution of the two instructions.

(7) When the destination register of the first instruction becomes the source register of the second instruction, further, the data-dependent relation between the instructions can be maintained as the hardware above inhibits the simultaneous execution of the two instructions.

The instruction execution frequency of the data processor generally ranges from 20 to 30% regarding the branch instructions, 20 to 30% regarding the memory-operation instruction, the remaining percentage representing the arithmetic instruction.

In the data processor capable of simultaneously executing the two instructions in the embodiment shown in FIG. 1, almost no problem is posed as far as performance is concerned even though the first instruction execution unit 651 is limited to use for the arithmetic and the branch instruction, and the second instruction execution unit 652 to use for the arithmetic and the memory-operation instruction. Moreover, a circuit scale to be implemented is rendered reducible as the function of each instruction execution unit is restrictive as described above.

Delayed Branch and Delay Slot

A delayed branch technique may often be used for the branch instruction. In this technique, the next one cycle of the branch instruction is called a delay slot and an instruction immediately following the branch instruction of the program compiled for an RISC processor is executed in this cycle. After the instruction immediately following the branch instruction is executed, an actual branch is caused.

The instruction immediately following the branch instruction of the program thus compiled for the RISC processor corresponds to an instruction immediately preceding the branch instruction of the program compiled for the data processor such a CISC processor.

In the RISC processor described above, on the other hand, the instruction immediately following the branch instruction (normally an instruction immediately preceding the branch instruction) is first executed and then the branch instruction is executed.

A detailed description has already been given of the delayed branch and the delay slot in 'mips RISC ARCHITECTURE' pp 1-9 to 1-11, Gerry Kane (1988).

In an ordinary processor, a multilevel pipeline for fetching, decoding and executing instructions is used to execute instructions in parallel.

For parallel pipeline processing, the instruction fetch unit continues to perform the process of fetching instructions following the branch instruction one after another during the time the address calculation of a branch target under the branch instruction is carried out.

In the conventional CISC processor, an instruction following the branch instruction fetched previously is nullified when branching is performed and a branch target instruction is newly fetched to have the instruction decoded and executed. The CISC processor allows no operation cycle to be automatically inserted immediately after the branch instruction which requires two execution cycles.

In the case of the RISC processor, on the other hand, the instruction following the branch instruction fetched previously (normally an instruction immediately preceding the branch instruction) is not nullified when the branching is performed and the former instruction is first executed and then the branch instruction is executed before a branch target instruction is fetched.

The cycle can thus be utilized effectively in the RISC processor by arranging effective instructions that are never to be nullified after the branch instruction in the program. The specification of the branch instruction as stated above is called a delayed branch, whereas one cycle after the branch instruction is called a delay slot.

Simultaneous Execution of Two Instructions in Delay Slot

A description will subsequently be given of a basic method of handling the delay slot of the delayed branch when the simultaneous execution of two instructions is performed in the RISC processor.

First, when the immediately preceding instruction is a conditional branch instruction and when two instructions are then fetched, only a first instruction is executed in the delay slot in case that (1) the condition of the conditional branch instruction is established. (2) If the condition of the conditional branch instruction is not established, the two instructions are executed in the delay slot on condition that the second instruction simultaneously with the first instruction is executable. The operation of the delayed branch will be described in detail with reference to an embodiment of FIG. 6(f).

Instruction Format

FIG. 2 illustrates instruction formats for the data processor of FIG. 1 as an embodiment of the present invention.

As shown in FIG. 2, one instruction is 32 bits in fixed length and divided into 6-, 5-, 5-, and 16-bit fields from the left end. The 6-bit field 210 at the left end designates an operation code (OP code) indicating the kind of instruction. The following 5-bit field 220 is a destination field for designating a register for storing the result of execution of the instruction. The next 5-bit field 230 is a first source field for designating one instruction input register. The 16-bit field 240 at the right end is a second source field for designating the other input register. The second source field 243 may be as 16-bit immediate data as shown in FIG. 2(A) or a register is designated by 5 bits at the right end 250 as shown in FIG. 2(B). The use of the second source field in either way is designated by the leftmost bit of the OP code 210; namely, when the bit is '0', it is used as shown in (A), whereas when '1', its is used as shown in (B). The instruction in the form of (A) is called an immediate instruction, whereas that in the form of (B) is called a register instruction.

Incidentally, the number of registers in the register file in this embodiment is 32 and when registers R0, R1, R2, ... R31 are designated, 5 bits are required as described above.

FIG. 5 shows bit allocation of the OP code 210.

An LUI (Load Upper Immediate) instruction 510 tells the connection of 16 bits of '0' to the right side of 16-bit immediate data in the second source field 240 to make it 32-bit immediate data and the storage of the data in the register indicated in the destination field 220.

An ADDI (Add Immediate) instruction 512 tells the connection of 16 bits of the same value as the most significant bit in the second source field 240 to the left side of the 16-bit immediate data in the second source field 240 to implement 32-bit immediate sign expansion, the addition of the contents of the register indicated in the first source field 230 thereto, and the storage of the result in the register indicated in the destination field 220.

A SUBI (Subtract Immediate) instruction 514 tells 32-bit immediate sign expansion as in the case of the ADDI instruction 512, the subtraction of the data from the contents of the register indicated in the first source field 230, and the storage of the result in the register indicated in the destination field 220.

An ANDI (AND Immediate) instruction 516 tells the connection of 16 bits of '0' to the left side of the 16-bit immediate data in the second source field 240 to implement 32-bit immediate sign expansion, the operation of a bit-to-bit AND with the contents of the register indicated in the first source field 230, and the storage of the result in the register indicated in the destination field 220.

An ORI (OR Immediate) instruction 518 and an EORI (Exclusive OR Immediate) instruction 520 tell the operation of OR and exclusive OR, respectively, as in the case of the ANDI instruction 516.

An SLLI (Shift Left Logical Immediate) instruction 522 tells the shifting of the contents of the register indicated in the first source field 230 to the left by the number of 16-bit immediate data in the second source field 240, and the storage of the result in the register indicated in the destination field 220. The value shifted in from the right end is '0.'

An SRLI (Shift Right Logical Immediate) instruction 524 tells shifting to the right contrary to the SLLI instruction 522. The value shifted in from the left end is '0.'

An SRAI (Shift Right Arithmetic Immediate) instruction 526, like the SRLI instruction 524, tells shifting to the right and the value shifted in from the left end is not '0' but the same value as the bit at the left end of the register indicated in the first source field 230.

An LD (Load) instruction 530, like the ADDI instruction 512, tells the 32-bit immediate sign expansion of the second source field 240, the addition of the result to the contents of the register indicated in the first source field 230 to make it an address, and the storage of the contents of the data memory indicated by that address in the register indicated in the destination field 220.

An ST (Store) instruction 532, like the LD instruction 530, tells the calculation of the address, and the storage of the contents of the register indicated by the destination field 220 into the data memory indicated by that address.

A Bcc (Branch instruction 536 is the conditional branch instruction that tells the connection of 16 bits of the same value as the most significant bit in the second source field 240 to the left side of the 16-bit immediate data in the second source field 240 to implement 32-bit immediate sign expansion when the condition is established, and the change of the program flow to the address obtained by adding the expanded value to the value of a PC (Program Counter) indicating the address of the present instruction. The then branch condition is designated by 5 bits in the destination field 220.

From an ADD instruction 552 up to an SRA instruction 566, these are instructions using the contents of a register as a second source operand in those from the ADDI instruction 512 up to the SRAI instruction 526, respectively.

A JUMP (Jump) instruction 576 is an unconditional branch instruction that makes the contents of the register indicated in the second source field 240 a branch target address and tells the change of the program flow to that address.

In this embodiment, those from the LUI instruction 510 up to the SRAI instruction 526 and from the ADD instruction 552 up to the SRA instruction 566 are classified as arithmetic instructions, whereas the LD instruction 530 and the ST instruction 532 are classified as memory operation instructions. Further, the Bcc instruction 536 and the JUMP instruction 576 are classified as branch instruction.

Operation of Two Instruction Parallel Execution

FIG. 3 illustrates operations performed when two instructions are simultaneously executed as characterized by the present invention.

Figure 3A:
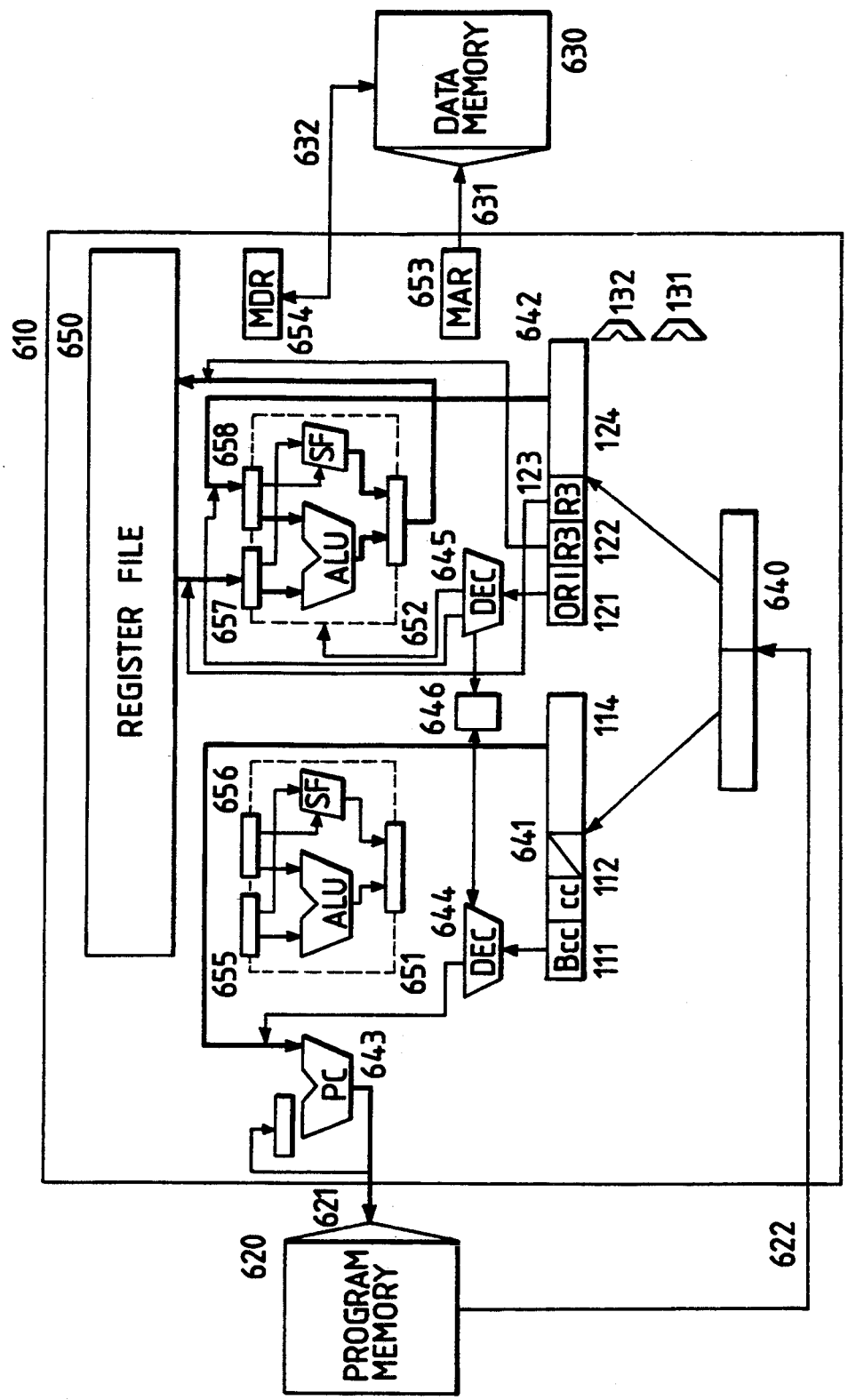
FIGS. 3(a), 3(b) and 3(c) each illustrate an instruction control method when two instructions are simultaneously executed in the data processor of FIG. 1.

First, FIG. 3(A) is a diagram illustrating operations performed widen the branch instruction and the arithmetic instruction are simultaneously executed. In this case, the branch instruction is fetched from the left side of the 64-bit instruction data bus 622 and the ORI instruction is fetched from the right side thereon. In the embodiment shown, these two instructions can simultaneously be executed.

The branch instruction fetched from the left side of the 64-bit instruction data bus 622 is set in the first instruction register 641 and the ORI instruction simultaneously fetched from the right side thereof is set in the second instruction register 641. The first instruction decoder 644 decodes an OP code field 111 of the first instruction register 641 to detect that it is the branch instruction and the second instruction decoder 645 decodes an OP code field 121 of the second instruction register 642 to detect that it is the arithmetic instruction (ORI instruction).

The parallel operation control unit 646 decides, from the results of decoding in the first and the second instruction decoders 644, 645, that the branch instruction and the arithmetic instruction thus fetched are of the kinds that are executable in parallel.

Moreover, as the result of execution is not set in the destination register according to the branch instruction, the source register according to the arithmetic instruction (ORI instruction) is seen not to conflict with the destination register. Based on the decision described above, the parallel operation control unit 646 starts to execute these two instructions in parallel in the same cycle.

In other words, the branch instruction is executed to calculate a branch target address by connecting 16 bits of immediate data codes to the left side of the 16-bit immediate data in the second source field 114 of the first instruction register 641 to implement 32-bit length expansion and inputting the 32-bit immediate data to the program counter 643 to add the data to the present instruction address. On the other hand, the branch target address above, is used to fetch the instruction that follows in case that the condition of the branch condition indicated in the destination field 112 is satisfactory.

Simultaneously, the ORI instruction is intended to read the contents of the R3 register in the register file 650 in accordance with the first source field 123 of the second instruction register 642 and to expand the 16-bit immediate data in the second source field to 32 bits in code length. The arithmetic logic unit 652 is used to seek the OR of the two data and the result is stored in the R3 register in the register file 650 indicated in the destination field 122. The arithmetic logic unit 652 is controlled by the second decoder 645 for decoding the OP code 121 of the second instruction register 642. The immediate expansion of the second source field 124 is also controlled by the second decoder 645.

When an instruction following a branch instruction and the branch instruction are executable in the same cycle, the former and the latter instruction are simultaneously executed in this embodiment and the execution of a new instruction is not to be started in the delay slot. Moreover, when an instruction following a branch instruction and the branch instruction are not executable in the same cycle, the former instruction is to be executed in the delay slot.

Therefore, no distinctions exist between the operation according to this embodiment and that of the conventional processor, so that compatibility therebetween is ensured.

As another embodiment of the present invention, there is considered, when an instruction following a branch instruction and the branch instruction are executable in the same cycle, a method of simultaneously executing the former and the latter instruction, and starting executing two new instructions in the delay slot. This is a case tantamount to having executed three instructions in the delay slot, whereby processing performance becomes improvable further.

A description has been given of a case where an instruction immediately preceding the branch instruction is not the branch instruction. However, as the branch instruction is controlled by compiler software and the like in such a way that the branch instruction is not arranged in the delay slot for another branch instruction in this embodiment, the instruction execution circuit has been so designed as to ignore such a case as this.

Figure 3B:
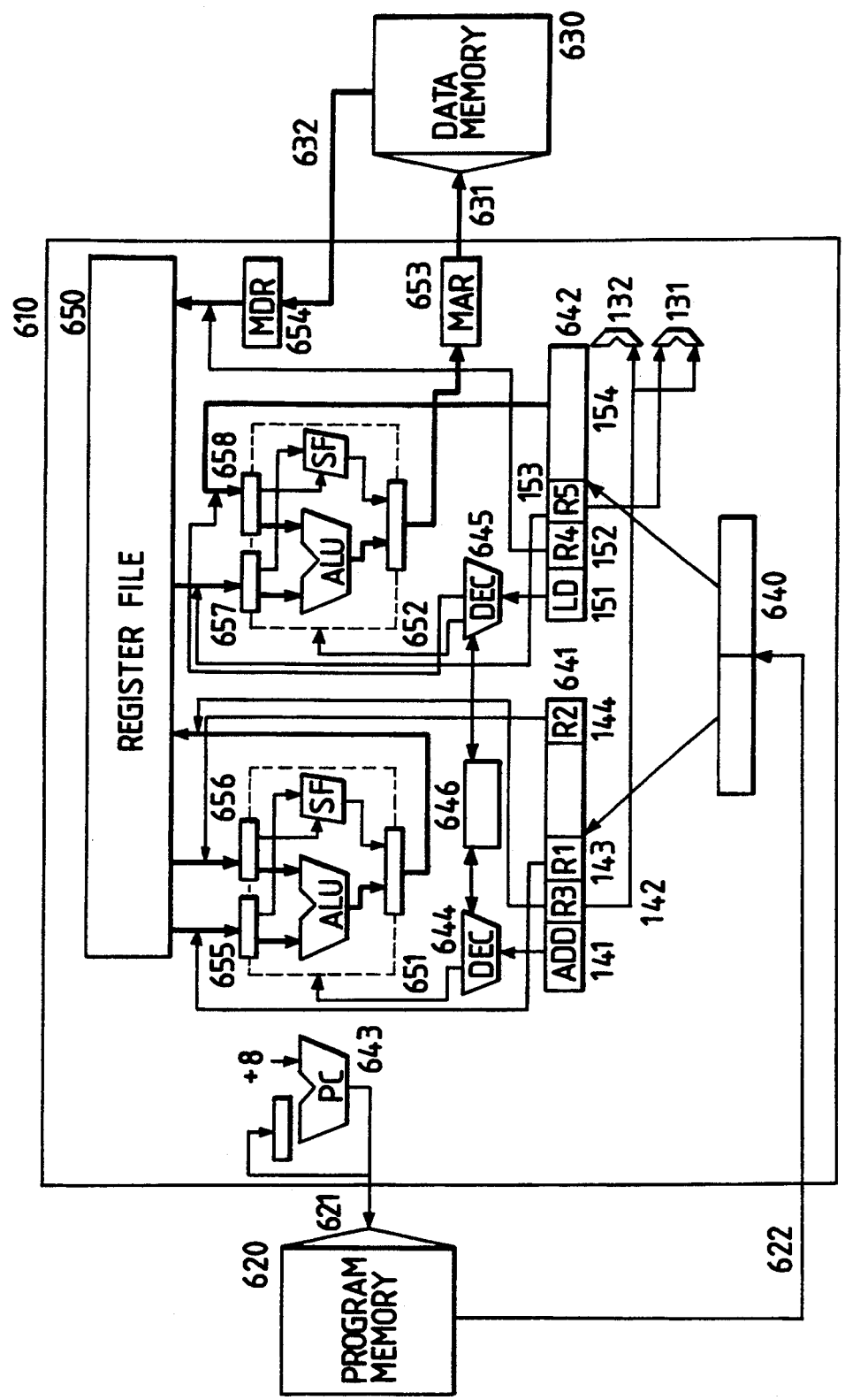

FIG. 3(B) is a diagram illustrating the operation of simultaneously executing the arithmetic instruction and the memory-operation instruction. In this case, the ADD instruction is fetched from the left side of the 64-bit instruction data bus 622 and the LD instruction is fetched from the right side thereof. With the ADD instruction, the contents of the R1 register and those of the R2 register in the register file 650 are added up and the result is stored in the R3 register, whereas the contents of the data memory 630 which makes a value an address are set in the R4 register, the value being obtained by adding the immediate data to the R5 register under the LD instruction. In this embodiment, those two instructions are simultaneously executable.

The ADD instruction fetched from the left side of the 64-bit instruction data bus 622 is transferred from the prefetch buffer 640 and set in the first instruction register 641. The LD instruction simultaneously fetched from the right side of the 64-bit instruction data bus 622 is transferred from the prefetch buffer 640 and set in the second instruction register 642. The first instruction decoder 644 decodes the OP code field 141 of the first instruction register 641 to detect that it is the arithmetic instruction (ADD instruction) and the second instruction decoder 645 decodes an OP code field 151 of the second instruction register 642 to detect that it is the memory-operation instruction (LD instruction).

Judging from the results of decoding in the first and the second instruction decoder 644, 645 connected to the parallel operation control unit 646, the two instructions described above are found to be those of the sort that can be executed in parallel.

The comparator 131 compares the destination field 142 of the first instruction register 641 with the first source field 153 of the second instruction register 642 to detect their mutual inconsistency. Based on this decision, the parallel operation control unit 646 start simultaneously executing these two instructions in parallel.

In other words, the ADD instruction is intended to read the contents of the R1 register in accordance with the first source field 143 of the first instruction register 641 and the contents of the R2 register in accordance with the second source field 144 thereof. The arithmetic logic unit 651 is then used to calculate the sum of these two data and the result is stored in the R3 register indicated in the destination field 142. Incidentally, the arithmetic logic unit 651 is controlled by the first decoder 644 for decoding the OP code 141 of the first instruction register 641.

Simultaneously, the LD instruction is intended to seek the value by adding a value of 32 bits length obtained by sign expansion from the 16-bit immediate data of the second source field 154 in the second instruction register 642 to the R5 register designated by the first source field 153 of the second instruction register 642 by means of the arithmetic logic unit 652, to set the resulting value in the MAR 653, to read the contents of the data memory 630 with the value as an address to the MDR 654 and to set the data thus read in the R4 register of the register file 650 indicated in the destination field 152 of the second instruction register 642. The arithmetic logic unit 652 is controlled by the second decoder 645 for decoding the OP code 151 of the second instruction register 642.

As an instruction to be subsequently executed is what is held in the prefetch buffer 640, the instruction of the prefetch buffer 640 is transferred to the first and the second instruction register 641, 642 before being executed likewise.

A description has been given of a case where an instruction immediately preceding the LD instruction is not the branch instruction but the ADD instruction. When the preceding instruction (what is on the left) is not the ADD instruction but the branch instruction as another operation example, the LD instruction and the branch instruction are simultaneously executed in this embodiment and a newly fetched instruction is inhibited from being executed in the delay slot of the branch instruction.

Figure 3C:
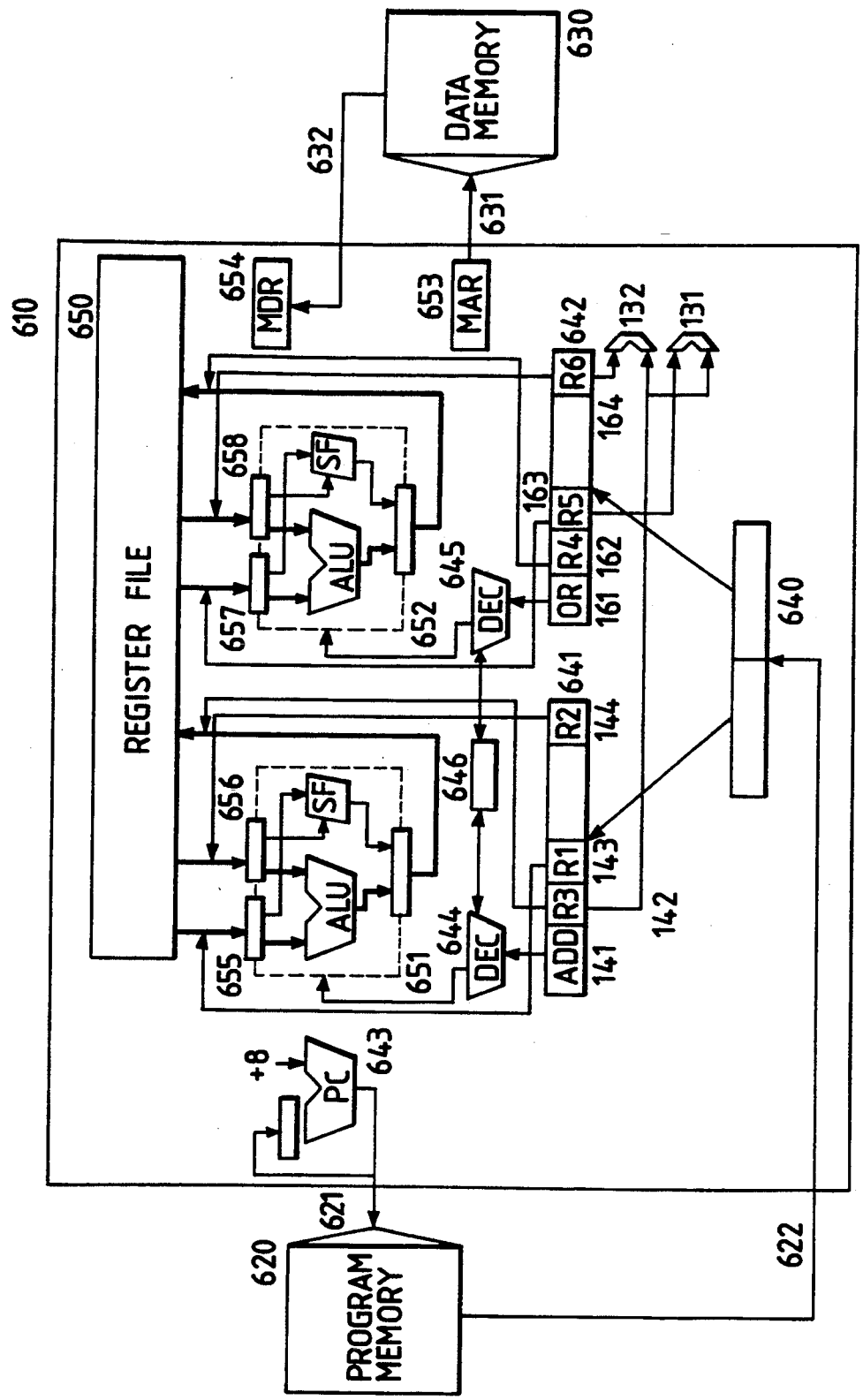

FIG. 3(C) is a diagram illustrating the operation of simultaneously executing two arithmetic instructions. In this case, the ADD instruction is fetched from the left side of the 64-bit instruction data bus 622 and the OR instruction is fetched from the right side thereof. The contents of the R1 register and those of the R2 register are add according to the ADD instruction and the result is stored in the R3 register, whereas the OR between the R5 register and the R6 register is obtained and stored in the R4 register. The two instructions can simultaneously be executed in this embodiment.

The ADD instruction fetched from the left side of the 64-bit instruction data bus 622 is set in the first instruction register 641. The OR instruction simultaneously fetched from the right side of the 64-bit instruction data bus 622 is set in the second instruction register 642. The first instruction decoder 644 decodes the OP code field 141 of the first instruction register 641 to detect that it is the arithmetic instruction (ADD instruction) and the second instruction decoder 645 decodes the OP code field 161 of the second instruction register 642 to detect that it is the arithmetic instruction (OR instruction).

Judging from the results of decoding in the first and the second instruction decoder 644, 645 connected to the parallel operation control unit 646, the two instructions described above are found to be those of the sort that can be executed in parallel.

The comparator 131 compares the destination field 142 of the first instruction register 641 with the first source field 163 of the second instruction register 642 to detect their mutual inconsistency. Further, the comparator 132 compares the destination field 142 of the first instruction register 641 with the second source field 164 of the second instruction register 642 to detect their mutual inconsistency. Based on these decisions, the parallel operation control unit 646 start simultaneously executing these two instructions in parallel.

In other words, the ADD instruction is intended to read the contents of the R1 register in accordance with the first source field 143 of the first instruction register 641 and the contents of the R2 register in accordance with the second source field 144 thereof. The arithmetic logic unit 651 is then used to seek the sum of these two data and the result is stored in the R3 register indicated in the destination field 142. Incidentally, the arithmetic logic unit 651 is controlled by the first decoder 644 for decoding the OP code 141 of the first instruction register 641.

Simultaneously, the OR instruction is intended to read the contents of the R5 register in accordance with the first source field 163 of the second instruction register 642 and the contents of the R6 register in accordance with the second source field 164 thereof. The arithmetic logic unit 652 is then used to calculate the OR of these two data and the result is stored in the R4 register indicated in a destination field 162. Incidentally, the arithmetic logic unit 652 is controlled by the second decoder 645 for decoding the OP code 161 of the second instruction register 642.

Pipeline Processing

Figure 4A:
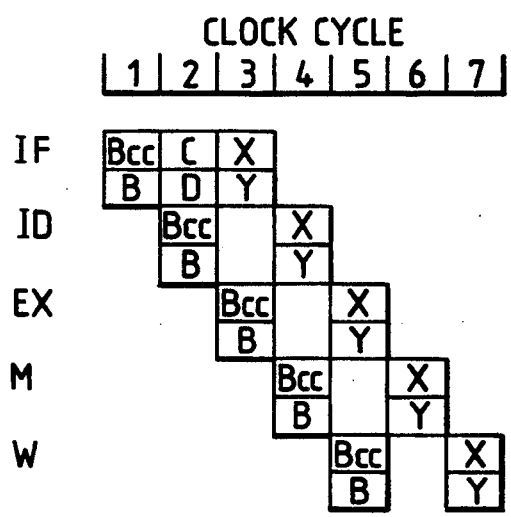
FIGS. 4(a), 4(b) and 4(c) each illustrate aspects of pipeline processing in the data processor of FIG. 1.
Figure 4C:
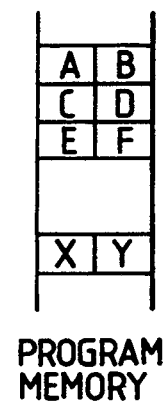

FIG. 4 illustrates pipeline processing in the processor according to the present invention. It is assumed that instructions A to F have been stored in the program memory 620 as shown in FIG. 4(C).

In FIG. 4(C), two instructions to be simultaneously fetched are arranged side by side and those on the upper side are young ones, whereas those on the lower side are large ones. Consequently, a program is executed sequentially in the descending order of instructions.

FIG. 4(A) is a diagram illustrating pipeline processing when two instructions are simultaneously executed as characterized by the present invention. Instructions A to F are assumed to be those stored in the program memory 620 as shown in FIG. 4(C); the instruction A is assumed to be the branch instruction Bcc branching off to an instruction X and the instruction B to be an arithmetic instruction. One box of FIG. 4(A) corresponds to one clock cycle operation at each pipeline stage. The pipeline stage consists of five stages, including IF (instruction fetch), ID (instruction decode), EX (execution), M(data fetch/store), and W (resulting storage).

The IF stage is the one at which an instruction is read from the program memory 620 to the prefetch buffer 640.

The ID stage is the one at which the instructions from the prefetch buffer 640 are set in the instruction registers 641, 642 and decoded in the instruction decoders 644, 645, so that necessary operand data is read from the register file 650.

The EX stage is the one at which the operand data is processed by the arithmetic logic units 651, 652.

The M stage is the one at which, provided the instruction is an LD or ST instruction, the data memory 630 is accessed; unless it is the LD or ST instruction, the result of execution is stored in the register file 650.

The W stage is the one at which, when the instruction is the LD instruction, the data read from the data memory 630 is stored in the register file 650.

The pipeline processing of FIG. 4(A) will subsequently be described on a clock cycle basis.

First clock cycle

Instructions (A and B) of 64 bits are fetched from the program memory 620 and set in the prefetch buffer 640.

Second clock cycle

The two instructions (A and B) held in the prefetch buffer 640 are respectively set in the first instruction register 641 and the second instruction register 642 and decoded in the first instruction decoder 644 and the second instruction decoder 645. As the instructions A, B are thus found to be a branch instruction and an arithmetic instruction, respectively, preparations are made to simultaneously execute the two instructions in the next cycle. At this time, register reading and immediate data expansion, if necessary, are carried out in this cycle. Moreover, the address calculation of a branch target is carried out in this cycle. On the other hand, the next instructions (C and D) of 64 bits are fetched from the program memory 620 before being set in the prefetch buffer 640.

Third clock cycle

The instruction A (branch instruction) decoded in the first instruction decoder 644 and the instruction B (arithmetic instruction) decoded in the second instructions decoder 645 are executed. With the branch condition established, the prefetch buffer 640 is cleared and the branch target address obtained in the preceding cycle is used to fetch an instruction again. In other words, the next instructions (X and Y) of 64 bits are fetched from the program memory 620 and set the prefetch buffer 640.

Fourth clock cycle

The result of execution of the instruction B is stored in the register and the two instructions (X and Y) stored in the prefetch buffer 640 are respectively set in the first and the second instruction register 641, 642 and decoded in the first and the second instruction decoder 644, 645. At this time, register reading and immediate data expansion, if necessary, are carried out in this cycle.

Fifth clock cycle

The two instructions (X and Y) decoded in the first and the second instruction decoder 644, 645 are executed. The same operation will follow hereafter.

Figure 4B:
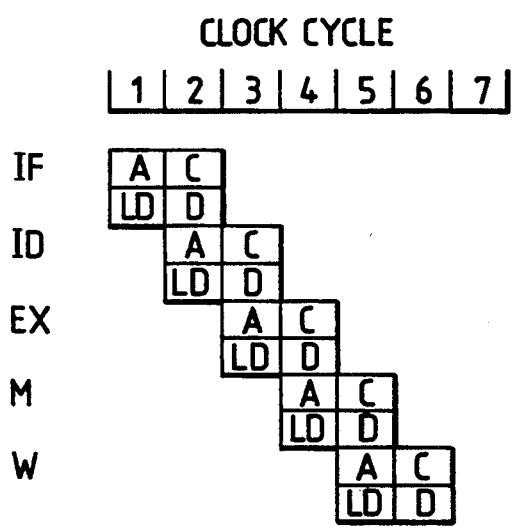

FIG. 4(B) is a diagram illustrating pipeline processing when two instructions are simultaneously executed as characterized by the present invention. Instructions A to F are assumed to be those stored in the program memory 620 as shown in FIG. 4(C); the instruction A is assumed to be an arithmetic instruction and the instruction B to be the LD instruction. The pipeline processing will subsequently be described on a clock cycle basis.

First clock cycle

Instructions (A and B) of 64 bits are fetched from the program memory 620 and set in the prefetch buffer 640.

Second clock cycle

The two instructions (A and B) held in the prefetch buffer 640 are respectively set in the first instruction register 641 and the second instruction register 642 and decoded in the first instruction decoder 644 and the second instruction decoder 645. As the instructions A, B are thus found to be an arithmetic instruction and the LD instruction, respectively, preparations are made to simultaneously execute the two instructions in the next cycle. At this time, register reading and immediate data expansion, if necessary, are carried out in this cycle. On the other hand, the next instructions (C and D) of 64 bits are fetched from the program memory 620 before being set in the prefetch buffer 640.

Third clock cycle

The instruction A (arithmetic instruction) decoded in the first instruction decoder 644 and the instruction B (LD instruction) decoded in the second instruction decoder 645 are executed. The effective address of operand data is calculated under the LD instruction. On the other hand, the two instructions (C and D) stored in the prefetch buffer 640 are respectively set in the first and the second instruction register 641, 642 and decoded in the first and the second instruction decoder 644, 645. At this time, register reading and immediate data expansion, if necessary, are carried out in this cycle.

Fourth clock cycle

The result of execution of the instruction A is stored in the register and the data memory 630 is accessed on the basis of the effective address of the operand of the LD instruction described above. On the other hand, the two instructions (C and D or X and Y) decoded in the first and the second instruction decoder 644, 645 are executed.

Fifth clock cycle

The fetched data is stored in the register under the LD instruction. The same operation will follow hereafter.

The data memory 630 above has been described as what is accessible in one cycle. When the data memory 630 is a cache memory, however, data to be accessed may not exist in tile cache memory (cache miss). It then needs additional cycles to access the main memory in comparison to a case where the cache memory is normally accessed. Although the data memory 630 has been treated as accessible in one cycle in the example described above, a necessary cycle as a dummy execution cycle (wait cycle) is to be inserted between the fourth and the fifth clock cycle in case of a cache miss.

Although a description will be given of the fact that the data memory 630 is basically accessible in one cycle hereinafter, such an additional dummy cycle may be inserted as occasion demands.

Register Conflict between Two Arithmetic Instructions

Figure 6A:
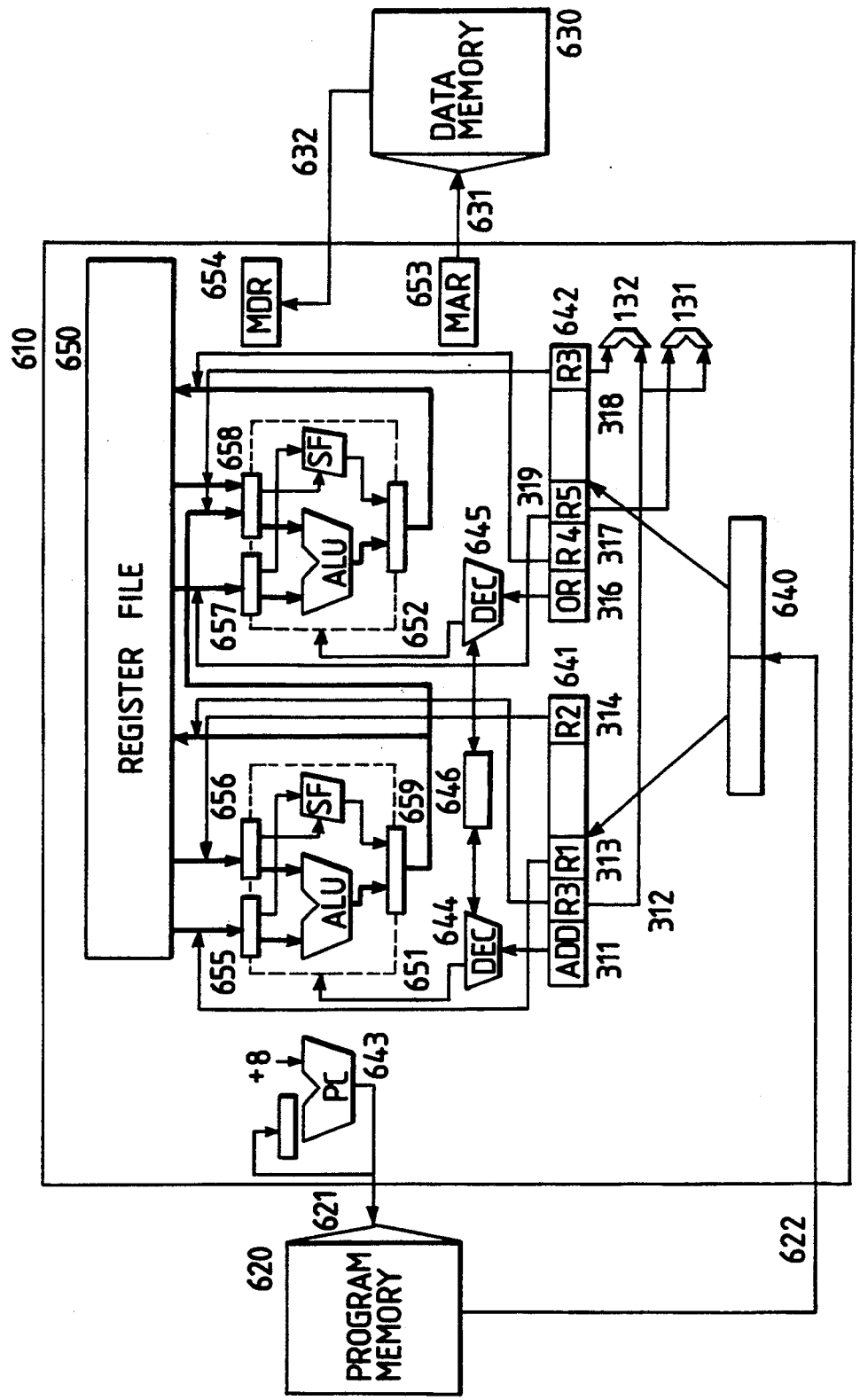
FIGS. 6(a), 6(b), 6(c), 6(d), 6(e), 6(f), and 6(g) illustrate individually an instruction control method when instructions are serially executed in the data processor of FIG. 1.

FIG. 6(A) is a diagram illustrating the presence of a register conflict between two arithmetic instructions. This is a case where the ADD instruction is fetched from the left side of the 64-bit instruction data bus 622 and the OR instruction is fetched from the right side thereof. The contents of the R1 register and those of the R2 register are add according to the ADD instruction and the result is stored in the R3 register, whereas the OR between the R5 register and the R3 register is obtained and stored in the R4 register. According to the present invention, the register conflict between the two instructions can be detected, so that execution in one cycle is inhibited.

The ADD instruction fetched from the left side of the 64 bit instruction data bus 622 is set in the first instruction register 641. The OR instruction simultaneously fetched from the right side of the 64-bit instruction data bus 622 is set in the second instruction register 642. The first instruction decoder 644 decodes the OP code field 311 of the first instruction register 641 to detect that it is the arithmetic instruction (ADD instruction) and the second instruction decoder 645 decodes the OP code field 316 of the second instruction register 642 to detect that it is the arithmetic instruction (OR instruction).

Judging from the results of decoding in the first and the second instruction decoder connected to the parallel operation control unit 646, the two instructions described above are found to be those of the sort that can be executed in parallel.

The comparator 131 compares the destination field 312 of the first instruction register 641 with the first source field 319 of the second instruction register 642 to detect their mutual inconsistency. However, the comparator 132 compares the destination field 312 of the first instruction register 641 with the second source field 318 of the second instruction register 642 to detect their mutual consistency. As a result, the parallel operation control unit 646 decides, from the detected output of the comparator 132, that these two instructions are non-executable in not only parallel but also the same cycle and serially executes them.

First, the ADD instruction is intended to read the contents of the R1 register in accordance with the first source field 313 of the first instruction register 641 and the contents of the R2 register in accordance with the second source field 314 thereof. The arithmetic logic unit 651 is then used to calculate the sum of these two data and the result is stored in the R3 register indicated in the destination field 312. Incidentally, the arithmetic logic unit 651 is controlled by the first decoder 644 for decoding the OP code 311 of the first instruction register 641.

All the arithmetic instructions in this embodiment are intended to complete execution in one cycle.

The next instruction can unconditionally be activated one cycle later accordingly.

Subsequently, the OR instruction is intended to read the contents of the R5 register in accordance with the first source field 319 of the second instruction register 642 and the contents of the R3 register in accordance with the second source field 318 thereof. The arithmetic logic unit 652 is then used to calculate the OR of these two data and the result is stored in the R4 register indicated in the destination field 317. Incidentally, the arithmetic logic unit 652 is controlled by the second decoder 645 for decoding the OP code 316 of the second instruction register 642.

In this embodiment, as described in reference to FIG. 4, register reading for the OR instruction is carried out simultaneously with the execution of the immediately preceding ADD instruction. For this reason, the contents of the register R3 have not yet contained the result of execution of the ADD instruction then.

When the register numbers conform to each other as detected by the comparator 132, it is preferred to provide a bypass means for setting the output of the arithmetic logic unit 651 in the output register 659 and simultaneously in the input register 658 of the arithmetic logic unit 652 instead of implementing reading from the register file 650.

As set forth above, even when the register conflict exists between the two instructions simultaneously fetched, the conflict is detected to ensure normal operations according to the embodiment shown.

Bus Conflict between Two Memory-Operation Instructions

As the memory-operation instruction is intended to access the data memory 630, a conflict may occur between access addresses of two memory-operation instructions on the operand address bus 631 if the two memory-operation instructions are executed in parallel. The two memory-operation instructions should be executed serially to solve this problem.

Figure 6B:
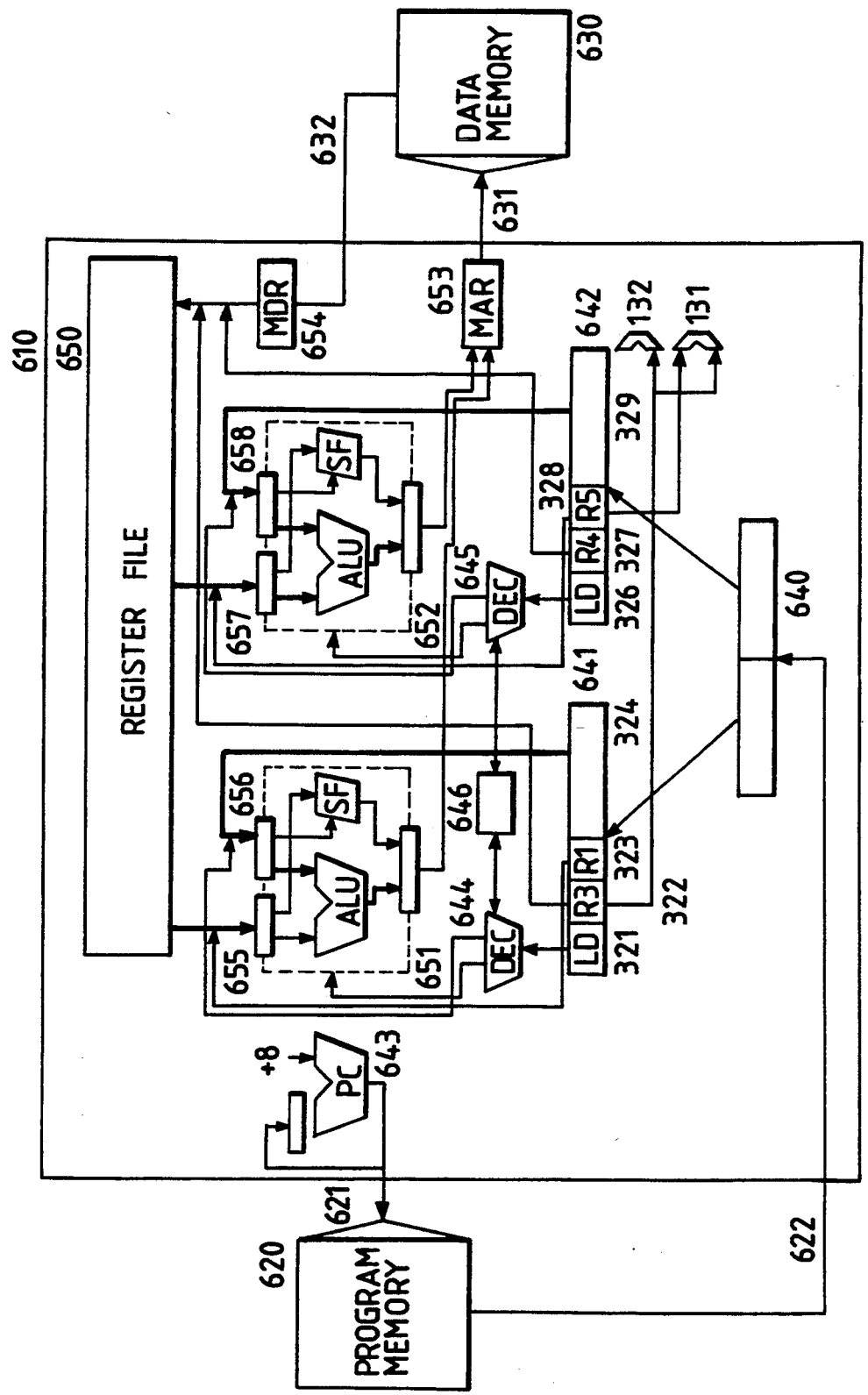

FIG. 6(B) is a diagram illustrating the operation of serially executing two continuous memory-operation instructions, The LD instructions are simultaneously fetched from the left and right sides of the 64-bit instruction data bus 622. The contents of the data memory 630 obtained by access with the value of adding the contents of the R1 register and the immediate data as an address is stored in the R3 register under the left-side LD instruction and the data memory 630 obtained by access with the value of adding the contents of the R5 register and the immediate data as an address is set in the R4 register under the right-side LD instruction. The two instructions above can be serialized before being executed in this embodiment.

The LD instruction fetched from the left side of the 64-bit instruction data bus 622 is set in the first instruction register 641. The LD instruction simultaneously fetched from the right side of the 64-bit instruction data bus 622 is set in the second instruction register 642. The first instruction decoder 644 decodes the OP code field 321 of the first instruction register 641 to detect that it is the memory-operation instruction (LD instruction) and the second instruction decoder 645 decodes the OP code field 326 of the second instruction register 642 to detect that it is the memory-operation instruction (LD instruction).

Judging from the results of decoding in the first and the second instruction decoder 644, 645 connected to the parallel operation control unit 646, the two instructions described above are found to be those of the sort that- cannot be executed in parallel.

Based on the decision made as described above, the parallel operation control unit 646 inhibits the two instructions from being executed in the same cycle according to this embodiment.

As described in reference to FIG. 4, the LD instruction tells the address to be calculated in the first cycle, the memory to be actually accessed in the second cycle, and the result to be set in the destination register in the third cycle.

A cycle-to-cycle procedure for the execution of the two instruction will subsequently be described.

In the first cycle, the left-side LD instruction is intended to read the contents of the R1 register in accordance with the first source field 323 of the first instruction register 641, and to calculate the value obtained by adding a value of 32 bits length obtained by sign expansion from the 16-bit immediate data of the second source field 324 thereto by means of the arithmetic logic unit 651, and to set the resulting value in the MAR 653. Incidentally, the arithmetic logic unit 651 is controlled by the first decoder 644 for decoding the OP code 321 of the first instruction register 641.

In the second cycle, the left-side LD instruction is intended to read the contents of the memory with the MAR 653 as an address to the MDR 654. Moreover, the right-side LD instruction is intended to calculate the value by adding a value of 32 bits length obtained by sign expansion from the 16-bit immediate data of the second source field 329 in the second instruction register 642 to the R5 register designated by the first source field 328 of the second instruction register 642 by means of the arithmetic logic unit 652, to set the resulting value in the MAR 653. The arithmetic logic unit 652 is controlled by the second decoder 645 for decoding the OP code 326 of the second instruction register 642.

In the third cycle, the left-side LD instruction is intended to set the data read from the MDR 654 in the R3 register indicated in the destination field 322 of the first register 641. Moreover, the right-side LD instruction is intended to read the contents of the data memory 630 with the MAR 653 as an address to the MDR 654.

In the fourth cycle, the right-side LD instruction is intended to set the data read from the MDR 654 in the R4 register indicated in the destination field 327 of the second register 642.

As set forth above, even when two of the memory-operation instructions are simultaneously fetched, they can be detected and normally serially operated in the embodiment shown.

Although a description has been given of a case where the destination register of the left-side LD instruction is not in conformity with the source register of the right-side LD instruction, if they conform to each other, the comparator 131 is usable to detect the consistency (register consistency, register conflict). In consideration of the delay slot of the left-side LD instruction, the parallel operation control unit 646 inserts a one-cycle wait before starting reading the register of the right-side LD instruction.

However, as set forth above, even if the one-cycle wait is inserted, the reading of the source register for the right-side LD instruction and the access to the data memory 630 of the left-side LD instruction are simultaneously carried out. Consequently, the result of execution of the right-side LD instruction has not yet been stored in the source register of the left-side LD instruction. When the register numbers conform to each other as detected by the comparator 131, it is preferred to provide a bypass means (not shown) for setting the data read from the data memory 630 in the input register 657 of the arithmetic logic unit 652 simultaneously with the MDR 654 instead of implementing reading from the register file 650 when the register numbers conform to each other as detected by the comparator 131 under the LD instruction as similar to FIG. 6(A).

Arithmetic Instruction Using the Result of Memory-Operation Instruction

As described in the embodiment of FIG. 1, the first instruction execution unit 651 of FIG. 1 is limited to what is used for the arithmetic instruction and the branch instruction, whereas the second instruction execution unit 652 to what is used for the arithmetic instruction and the memory-operation instruction.

Assuming the memory-operation instruction and the arithmetic instruction are set in the first instruction register 641 and the second instruction register 642 against the prerequisite concerning the functional limitations.

The two instructions cannot be executed in parallel but have to be serially executed.

Figure 6C:
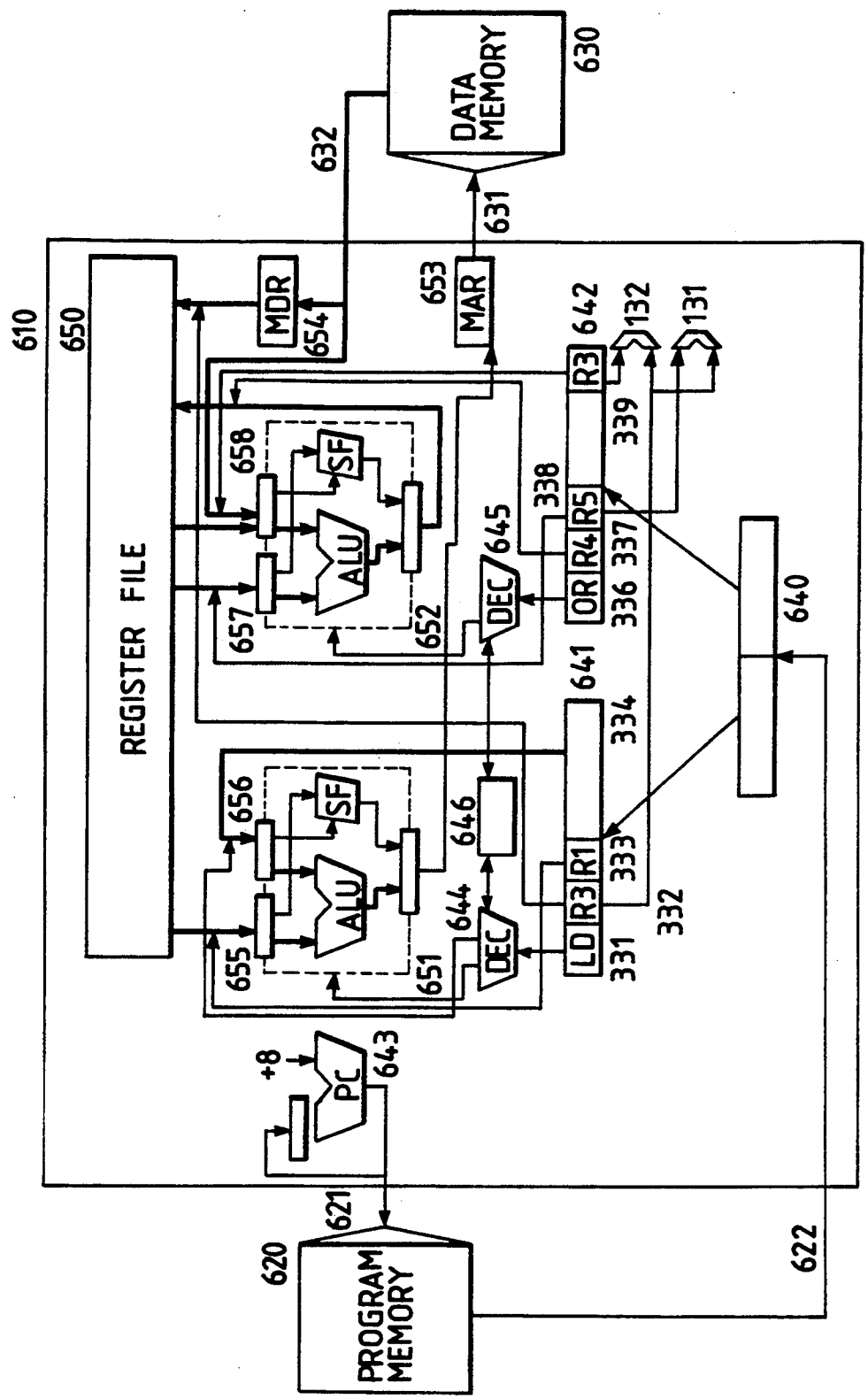

FIG. 6(C) is a diagram illustrating the operation of executing the arithmetic instruction using the result of the memory-operation instruction. This is a case where the LD instruction is fetched from the left side of the 64-bit instruction data bus 622 and the OR instruction is fetched from the right side of the 64-bit instruction data bus 622. Under the LD instruction, the contents of the data memory 630 obtained by access with the value of adding the contents of the R1 register and the immediate data as an address are stored in the R3 register and under the OR instruction, the OR between the R5 register and the R3 register, the result being stored in the R4 register. In this embodiment, these two instructions can be serialized and executed.

The LD instruction fetched from the left side of the 64-bit instruction data bus 622 is set in the first instruction register 641. The OR instruction simultaneously fetched from the right side of the 64-bit instruction data bus 622 is set in the second instruction register 642. The first instruction decoder 644 decodes the OP code field 331 of the first instruction register 641 to detect that it is the memory-operation instruction (LD instruction) and the second instruction decoder 645 decodes the OP code field 336 of the second instruction register 642 to detect that it is the arithmetic instruction (OR instruction).

Judging from the results of decoding in the first and the second instruction decoder 644, 645 connected to the parallel operation control unit 646, the two instructions described above are found to be those of the sort that cannot be executed in parallel.

The comparator 131 compares the destination field 332 of the first instruction register 641 with the first source field 338 of the second instruction register 642 to detect their mutual inconsistency. The comparator 132 compares the destination field 332 of the first instruction register 641 with the second source field 339 of the second instruction register 642 to detect their mutual consistency. As described in the embodiment of FIG. 4, the result of the LD instruction becomes effective two cycles later. When it is attempted to use the result of the LD instruction in the next instruction, the parallel operation control unit 646 inserts a one-cycle wait before starting reading the register of the next instruction and starts the next instruction.

Based on the decision made as described above, the parallel operation control unit 646 inhibits the two instructions from being executed in the same cycle according to this embodiment.

A cycle-to-cycle procedure for the execution of the two instruction will subsequently be described.

In the first cycle, the LD instruction is intended to read the contents of the R1 register in accordance with the first source field 333 of the first instruction register 641 to the input register 655, and to set a value of 32 bits length obtained by sign expansion from the 16-bit immediate data of the second source field 334 in the input register 656.

In the second cycle, the arithmetic logic unit 651 is used to obtain a memory address and this value is set in the MAR 653. Incidentally, the arithmetic logic unit 651 is controlled by the first decoder 644 for decoding the OP code 331 of the first instruction register 641. A new instruction (OR instruction in this case) is not executed in this cycle and one cycle is to be waited for.

In the third cycle, the LD instruction is intended to read the contents of the data memory 630 with the MAR 653 as an address to the MDR 654.

Moreover, the OR instruction is intended to read the contents of the R5 register in accordance with the first source field 338 of the second instruction register 642 to the input register 657 and the contents of the R3 register in accordance with the second source field 339 of the second instruction register 642 to the input register 658. The LD instruction is to update the contents of the R3 register in the next cycle in order to correct them. When the register numbers conform to each other as detected by the comparator 132 under an instruction immediately preceding the LD instruction as similar to the embodiment of FIG. 6(A), the immediately preceding instruction has, when the register numbers conform to each other under the LD instruction, the function of writing the data read from the data memory 630 to the MDR 654, instead of reading it from the register file 650, and simultaneously bypassing it toward the B-side input register 658 of the arithmetic logic unit 652 as in the case of the embodiment of FIG. 6(A).

In the fourth cycle, the LD instruction is intended to set the data read from the MDR 654 in the R3 register indicated in the destination field 332 of the first register 641.

The OR instruction is intended to calculate the OR between the two data by means of arithmetic logic unit 652. Incidentally, the arithmetic logic unit 652 is controlled by the second decoder 645 for decoding the OP code 336 of the second instruction register 642.

In the fifth cycle, the result of the OR instruction is stored in the R4 register indicated by the destination field 337.

Even when the instruction using the result of the memory-operation instruction and this memory-operation instruction are simultaneously fetched, these can be detected and serialized for normal operation according to the present invention.

Branch Instruction Using Arithmetic Instruction

As described in the embodiment of FIG. 1, the first instruction execution unit 651 of FIG. 1 is limited to what is used for the arithmetic instruction and the branch instruction, whereas the second instruction execution unit 652 to what is used for the arithmetic instruction and the memory-operation instruction.

Assuming the arithmetic instruction and the branch instruction are set in the first instruction register 641 and the second instruction register 642 against the prerequisite concerning the functional limitations.

The two instructions cannot be executed in parallel but have to be serially executed.

Figure 6D:
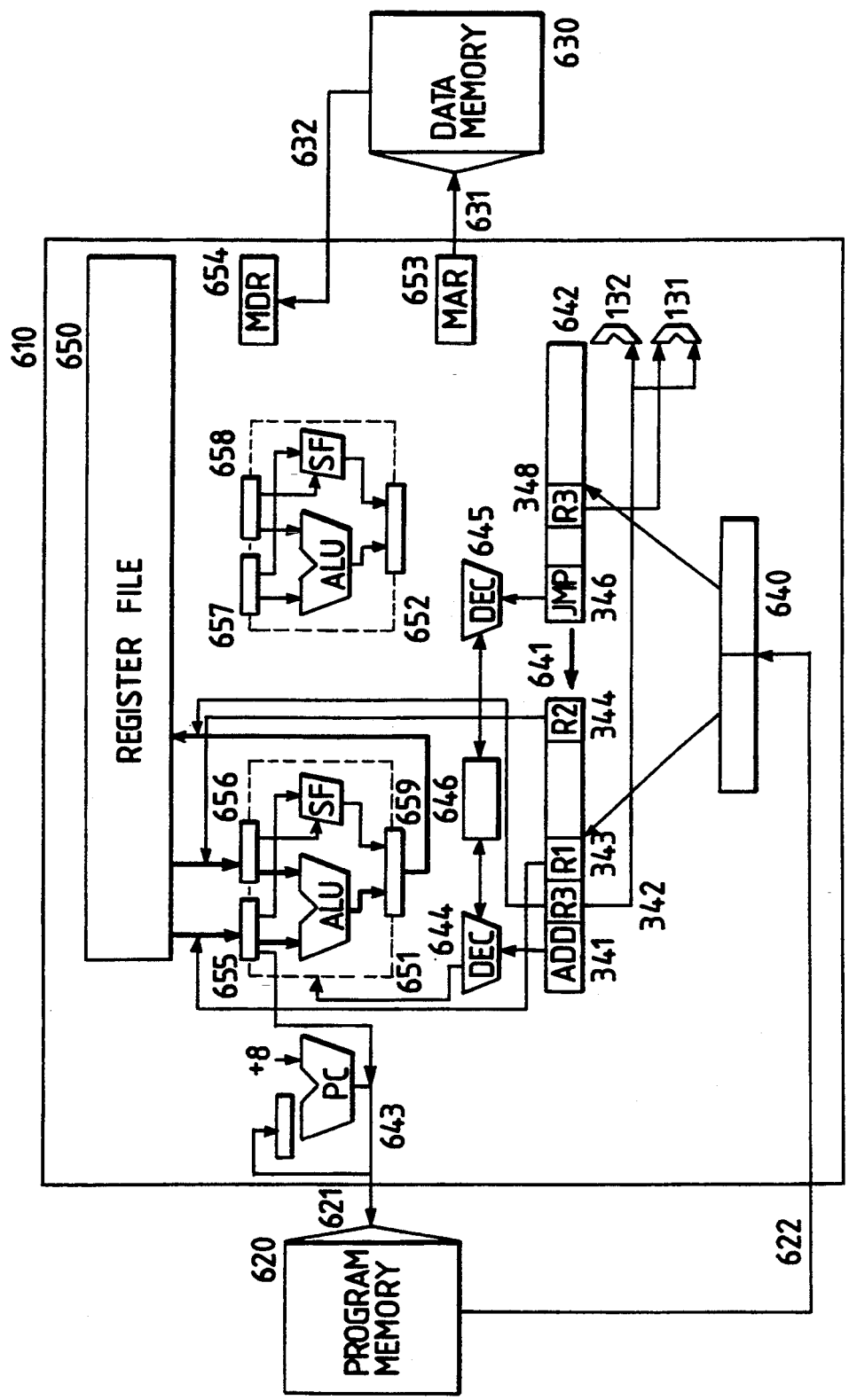

FIG. 6(D) is a diagram illustrating operations performed when the result of the arithmetic instruction is the branch target address of the branch instruction.

This is a case where the ADD instruction is fetched from the left side of the 64-bit instruction data bus 622 and the JUMP instruction is fetched from the right side thereof.

Under the ADD instruction, the contents of the R1 register and those of the R2 register are added up and the result is stored in the R3 register, the result branching off to the address indicated in the R3 register.

According to the embodiment shown, the conflict between the two instruction registers can be detected, which inhibits the parallel execution of the two instructions in one cycle.

The ADD instruction fetched from the left side of the 64-bit instruction data bus 622 is set in the first instruction register 641 and the JUMP instruction simultaneously fetched from the right side of the 64-bit instruction data bus 622 is set in the second instruction register 642. The first instruction decoder 644 decodes the OP code field 341 of the first instruction register 641 to detect that it is the arithmetic instruction (ADD instruction) and the second instruction decoder 645 decodes the OP code field 346 of the second instruction register 642 to detect that it the branch instruction (JUMP instruction).

Judging from the results of decoding the first and the second instruction decoder 644, 645 connected to the parallel operation control unit 646, the two instructions described above are found to be those of the sort that cannot be executed in parallel.

The comparator 131 compares the destination field 342 of the first instruction register 641 with the first source field 348 of the second instruction register 642 to detect their mutual consistency. As a result, the parallel operation control unit 646 decides that these two instructions are nonexecutable in not only parallel but also the same cycle and serially executes them.

First, the ADD instruction is intended to read the contents of the R1 register in accordance with the first source field 343 of the first instruction register 641 and the contents of the R2 register in accordance with the second source field 344 thereof. The arithmetic logic unit 651 is then used to calculate the sum of these two data and the result is stored in the R3 register indicated in the destination field 342. Incidentally, the arithmetic logic unit 651 is controlled by the first decoder 644 for decoding the OP code 341 of the first instruction register 641.

Subsequently, the operation of the JUMP instruction will be described. The branch instruction is normally set in the first instruction register 641 and executed in this embodiment. In the cycle following the one in which the ADD instruction has been executed, the parallel operation control unit 646 transfers the contents of the second instruction register 642 (JUMP instruction) to the finest instruction register 641 and starts executing the JUMP instruction. In other words, the parallel operation control unit 646 reads the contents of the R3 register in accordance with a first source field 343' (not shown) and with the result as a branch target address, implements instruction fetching thereafter.

On the other hand, the comparator 131 compares the destination field 342 of the first instruction register 641 with the first source field 348 of the second instruction register 642 to detect their mutual consistency prior to the execution of the ADD instruction. As shown in FIG. 4, the contents of the register R3 have not yet contained the result of execution of the ADD instruction at a point of time to carry out register reading for the JUMP instruction.

As similar to FIG. 6(A), when the register numbers conform to each other as detected by the comparator 131 and when the right-side instruction is transferred to the left-side of the instruction register 641, there is provided a bypass means (not shown) for setting the output of the arithmetic logic unit 651 in the output register 659 and simultaneously in the input register 655 of the arithmetic logic unit 651 instead of reading from the register file 650.

As set forth above, even when the register conflict exists between the two instructions simultaneously fetched and even when the branch instruction is not in the normal position, not only the conflict but also the position of the instruction is detected to ensure normal operations according to the embodiment shown.

Setting of Branch Target Instruction in Second Instruction Register 642

Figure 6E:
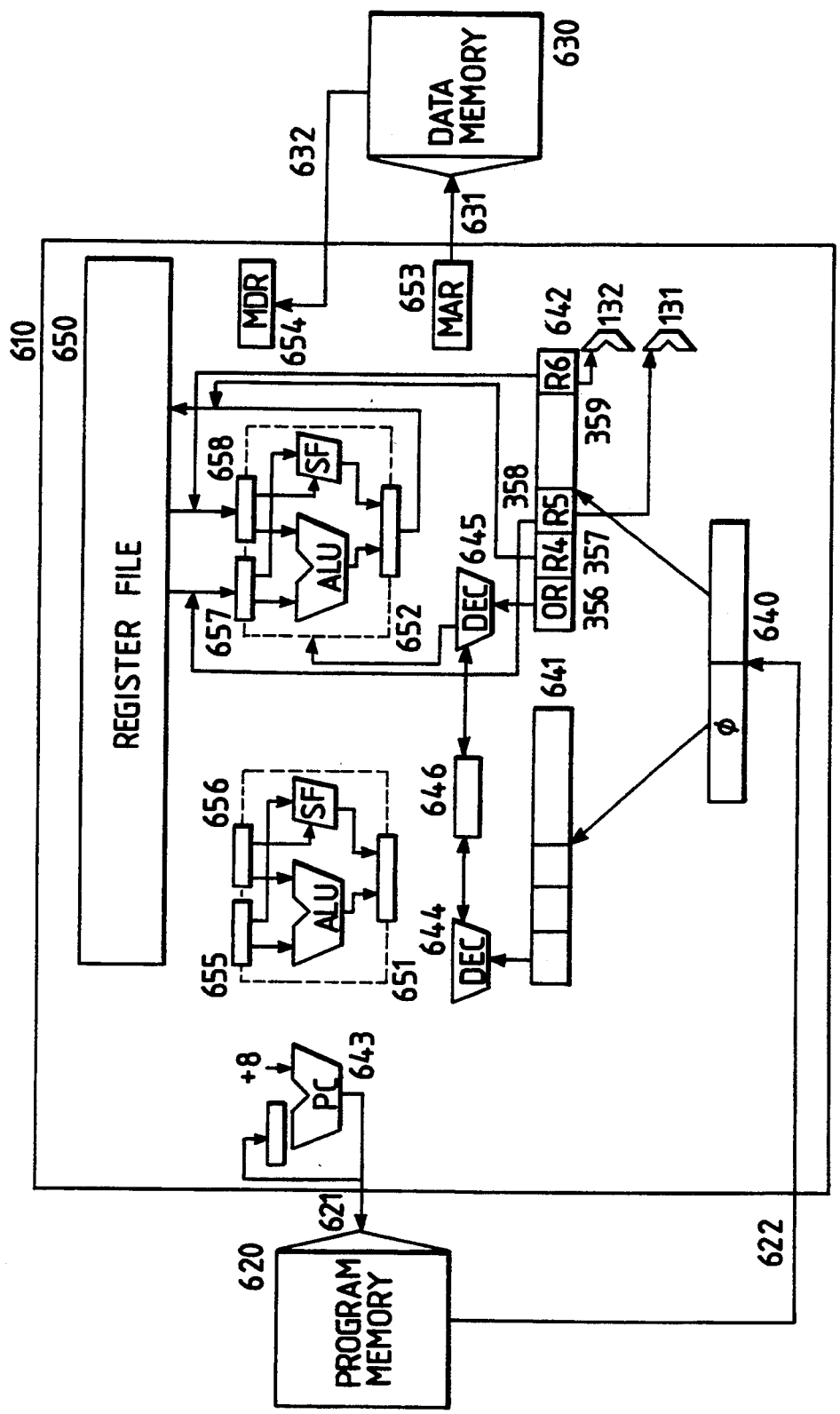

FIG. 6(E) is a diagram illustrating a branch to the instruction on the right side of the 64-bit instruction bus under the branch instruction. This is a case where the OR instruction is fetched from the right side of the 64-bit instruction data bus 622. Under the OR instruction, the OR between the R5 register and the R6 register is obtained and stored in the R4 register. The two instructions can thus be inhibited from being executed in the same cycle when the left-side instruction is not allowed to be executed according to the present invention.

The OR instruction fetched from the right side of the 64-bit instruction data bus 622 is set in the second instruction register 642.

When the parallel operation control unit 646 detects that an instruction branches to the right side of the 64-bit instruction bus under the immediately preceding branch instruction, it inhibits the operation of the first instruction decoder 644 and ignores the instruction set in the first instruction register 641. The second instruction decoder 645 decodes the OP code field 356 of the second instruction register 642 to detect that it is the arithmetic instruction (OR instruction).

As the parallel operation control unit 646 perceives the instruction to be the sort that can be executable in the right-side arithmetic logic unit 652, it starts the execution.

The OR instruction is intended to read the contents of the R5 register in accordance with the first source field 358 of the second instruction register 642 and the contents of the R6 register in accordance with the second source field 359 of the second instruction register 642. The OR instruction is also intended to calculate the OR between the two data and store the result in the R4 register indicated in the destination field 357. Incidentally, the arithmetic logic unit 652 is controlled by the second decoder 645 for decoding the OP code 356 of the second instruction register 642.

As set forth above, the execution of the left-side instruction can be inhibited when it branches to the right side of the 64-bit instruction bus under the branch instruction.

Execution of Instruction in Delay Slot

Figure 6F:
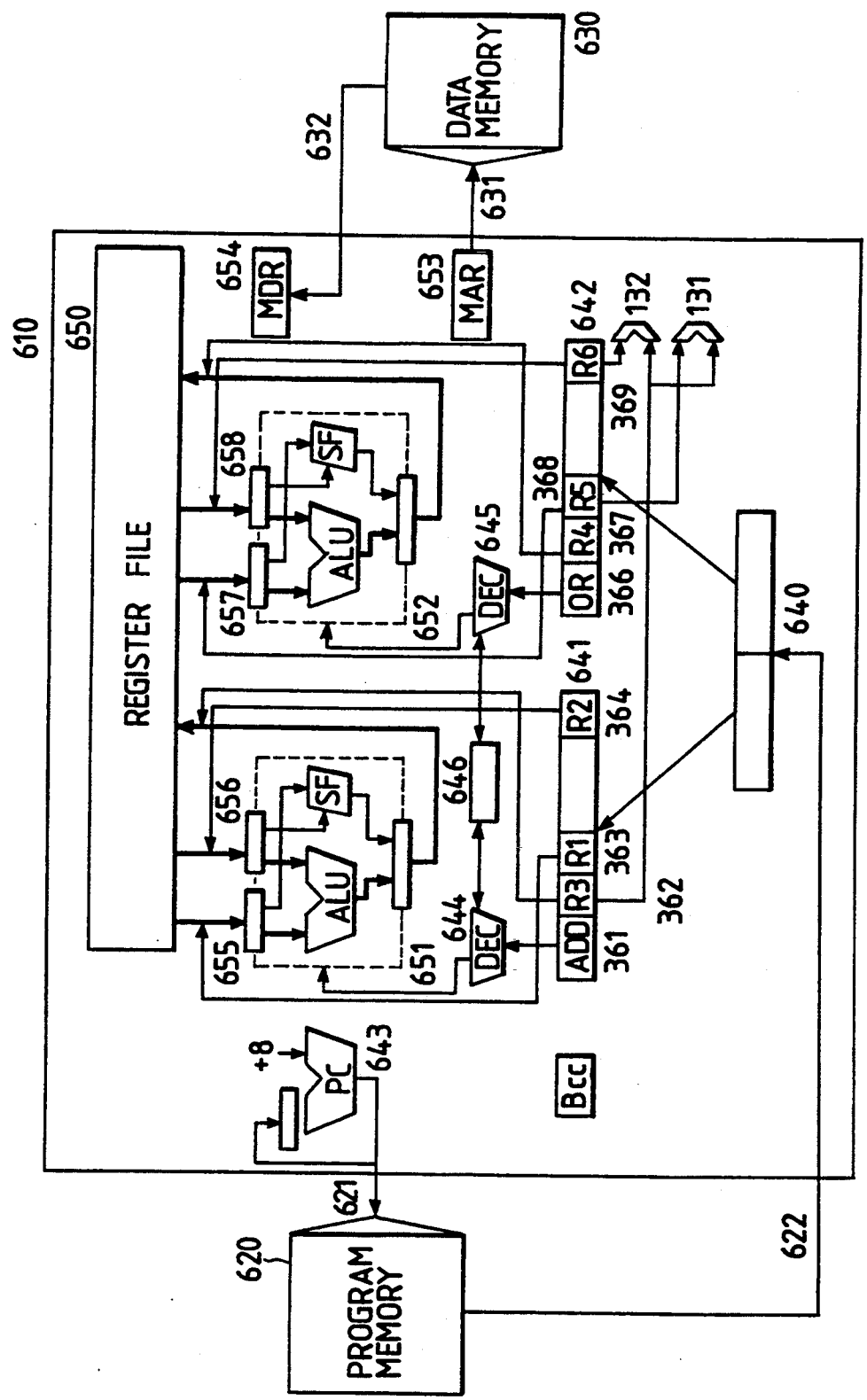

FIG. 6(F) is a diagram illustrating the operation performed when the immediately preceding conditional branch instruction is fetched and when an instruction immediately following the branch instruction is fetched which results in making the left-side instruction a delay slot.

In other words, the left-side instruction is unconditionally executed, irrespective of the fact that the branch condition of the branch instruction is established or not. On the other hand, the right-side instruction is, as described above, executed only when the branch condition has been established.

In this embodiment, the ADD instruction is fetched from the left side of the 64-bit instruction data bus 622, whereas the OR instruction is fetched from the right side thereof. Under the ADD instruction of the delay slot, the contents of the R1 register and those of the R2 register are added up and the result is stored in the R3 register. When the conditional branch instruction is unestablished, the OR between the R5 register and the R6 register is calculated under the OR instruction and the result is stored in the R4 register.

When the branch condition has been established, the right-side instruction is inhibited, whereas when that condition is not established, the two instructions call simultaneously be executed.

The ADD instruction fetched from the left side of the 64-bit instruction data bus 622 is set in the first instruction register 641 and the OR instruction simultaneously fetched from the right side of the 64-bit instruction data bus 622 is set in the second instruction register 642. The first instruction decoder 644 decodes the OP code field 361 of the first instruction register 641 to detect that it is the arithmetic instruction (ADD instruction) and the second instruction decoder 645 decodes the OP code field 366 of the second instruction register 642 to detect that it is the arithmetic instruction (OR instruction).

Judging from the results of decoding in the first and the second instruction decoder 644, 645 connected to the parallel operation control unit 646, the two instructions described above are found to be those of the sort that can be executed in parallel.

The comparator 131 compares the destination field 362 of the first instruction register 641 with the first source field 368 of the second instruction register 642 to detect their mutual inconsistency. The comparator 132 compares the destination field 362 of the first instruction register 641 with the second source field 369 of the second instruction register 642 to detect their mutual inconsistency.

The parallel operation control unit 646 executes, if the condition of the immediately preceding branch instruction is not established, two instructions in parallel. If the condition is otherwise established, the parallel operation control unit 646 nullifies the second instruction decoder 645, inhibits the execution of the right-side instruction, and executes only the left-side instruction.

As set forth above, even though one of the instructions simultaneously fetched is placed in the delay slot, the other one can be nullified, depending on the establishment/non-establishment of branching, to ensure normal operations.

Instruction Using Fetching Result of Immediately Preceding LD Instruction

Figure 6G:
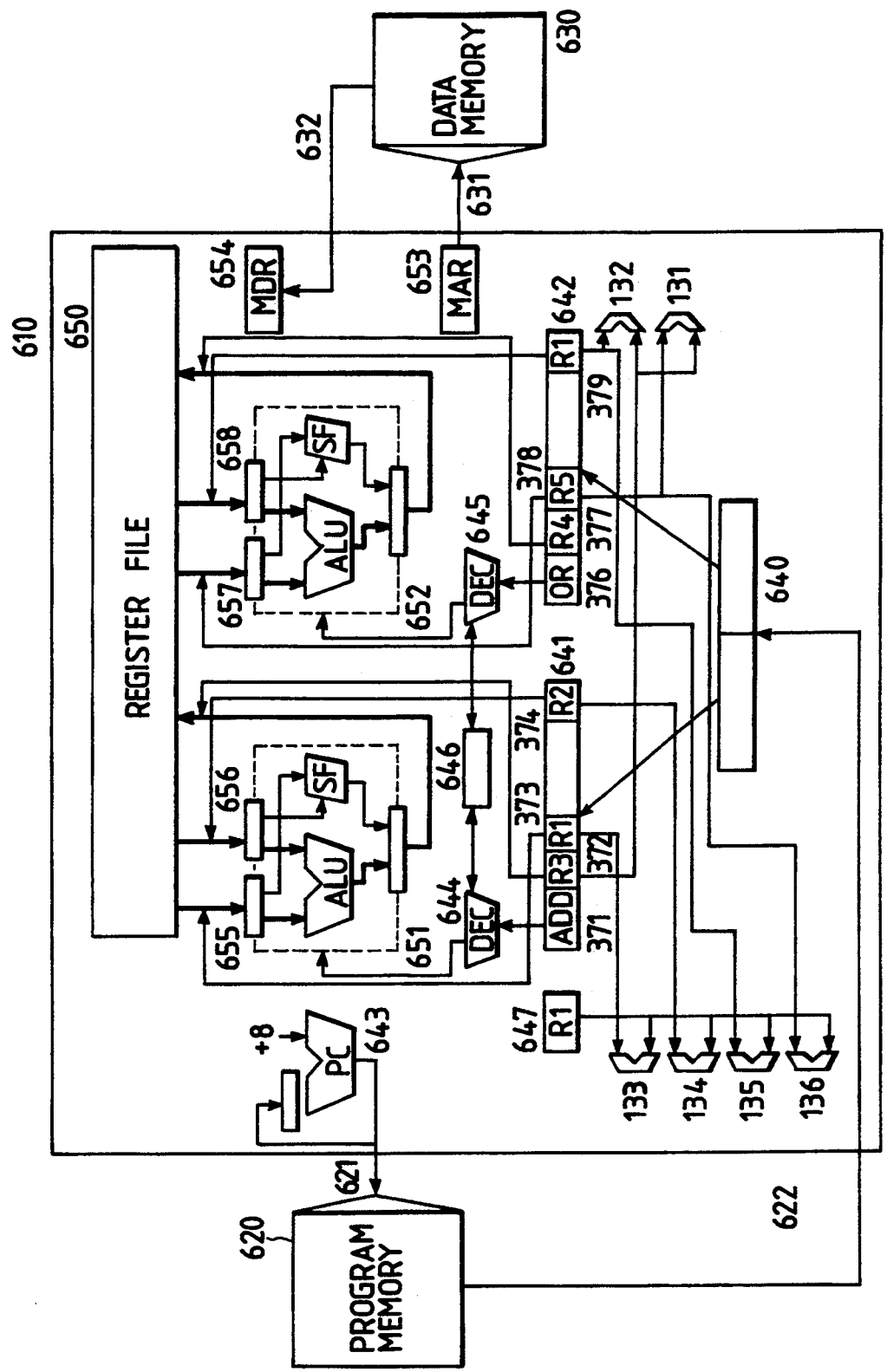

FIG. 6(G) is a diagram illustrating the operation of utilizing the fetching result of the immediately preceding LD instruction. This is a case where the ADD instruction is fetched from the left side of the 64-bit instruction data bus 622 and the OR instruction is fetched from the right side thereof. Under the immediately preceding LD instruction, data from the data memory 630 is set in the R1 register. Under the next ADD instruction, the contents of the R1 register and those of the R2 register are added up and the result is stored in the R3 register. Under the OR instruction, the OR between the R5 register and the R1 register is obtained and the result is stored in the R4 register.

As described in FIG. 4 and FIGS. 6(B) and 6(C), the contents of the R1 register are not valid in the cycle immediately following the execution of the LD instruction in this embodiment. Consequently, a one-cycle wait can be inserted in such a case that the immediately following instruction is a register conflict.

The ADD instruction fetched from the left side of the 64-bit instruction data bus 622 is set in the first instruction register 641 and the OR instruction simultaneously fetched from the right side of the 64-bit instruction data bus 622 is set in the second instruction register 642. The first instruction decoder 644 decodes the OP code field 371 of the first instruction register 641 to detect that it is the arithmetic instruction (ADD instruction) and the second instruction decoder 645 decodes the OP code field 376 of the second instruction register 642 to detect that it is the arithmetic instruction (OR instruction). Based on the detection above, the parallel operation control unit 646 perceives these two instructions to be those which can be executed in parallel.

On the other hand, a comparator 133 compares the first source field 373 of the first instruction register 641 with a delayed load register 647 to detect their mutual consistency. A comparator 134 compares the second source field 374 of the first instruction register 641 with the delayed load register 647 to detect their mutual inconsistency.

A comparator 136 compares the first source field 378 of the second instruction register 642 with a delayed load register 647 to detect their mutual inconsistency. A comparator 135 compares the second source field 379 of the second instruction register 642 with the delayed load register 647 to detect their mutual consistency.

The parallel operation control unit 646 inserts a one-cycle wait before starting the ADD instruction of the first instruction register 641 and the OR instruction of the second instruction register 642. Then the parallel operation control unit 646 executes the two instructions in parallel. The number of the destination register of the LD instruction is to be set in the delayed load register 647.

Even when the two instructions simultaneously fetched uses the memory reading data of the immediately preceding LD instruction, normal operations are ensured in consideration of the register conflict according to the embodiment shown.

Although a description has been given of a case where both the left- and right-side instructions use the result of the immediately preceding LD instruction, the parallel operation control unit 646 operates the two arithmetic logic unit 651, 652 in parallel as usual when both of them are not used.

When only the right-side instruction uses the result of the LD instruction, moreover, the left-side instruction is first executed and the right-side instruction is then executed as the LD instruction is completed in the meantime.

Further, when only the left-side instruction uses the result of the LD instruction, both the left- and right-side instructions are so controlled that they are waited for as in the case of FIG. 6(G) to simplify the parallel operation control unit 646 in construction.

Exception Processing

Figure 7A:
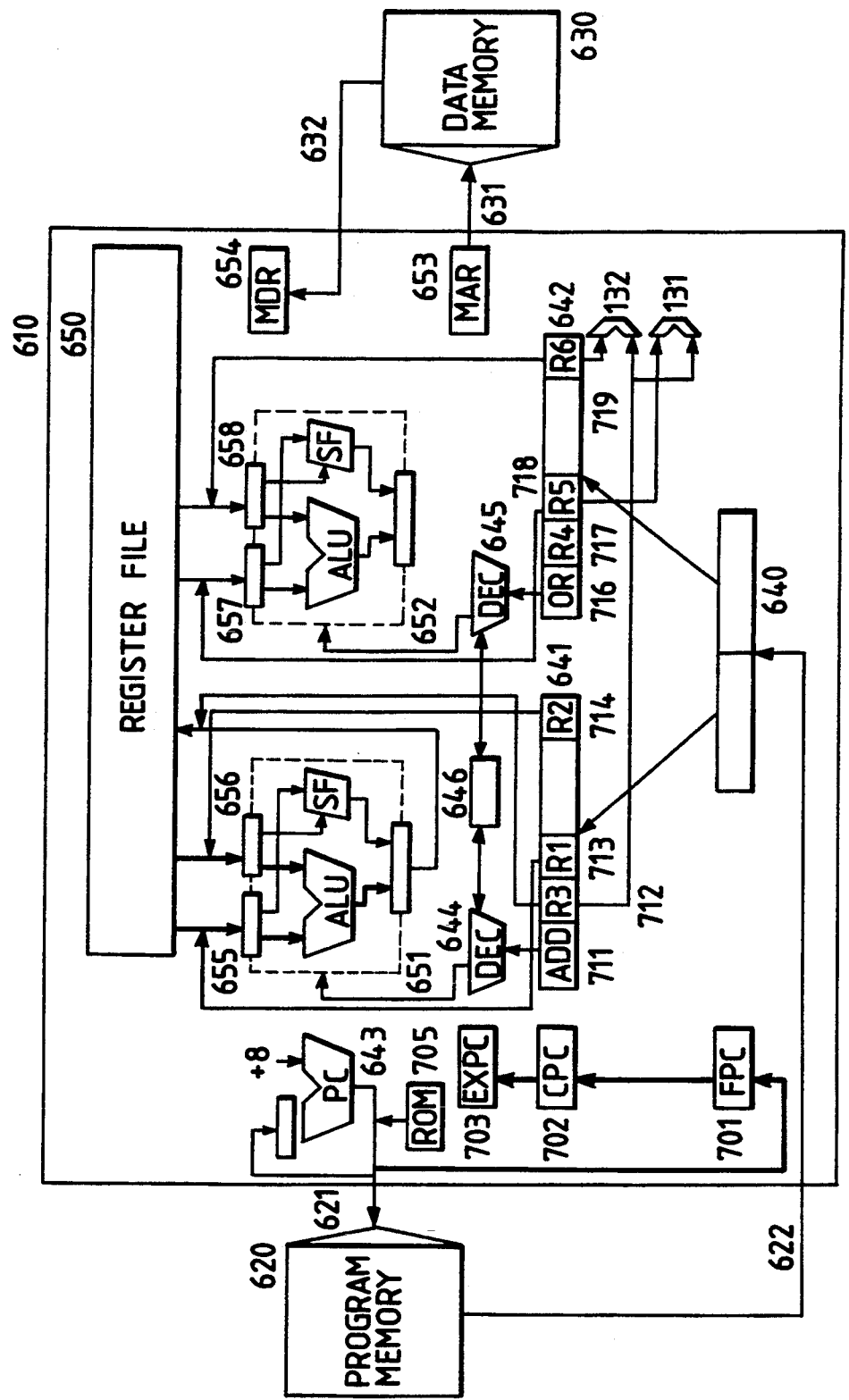
FIGS. 7(a) and 7(b) illustrate individually a method of processing an exception, when it occurs, while two instructions are being simultaneously executed in the data processor of FIG. 1.

FIG. 7(A) is a diagram illustration operations performed when an exception occurs in the left-side instruction during the time two arithmetic instructions are being simultaneously executed.

This is a case where the ADD instruction is fetched from the left side of the 64-bit instruction data bus 622 and the OR instruction is simultaneously fetched from the right side thereof. The contents of R1 register and those of the R2 register are added up under the ADD instruction and the result is stored in the R3 register, whereas the OR between the R5 register and the R6 register is obtained under the OP instruction before being stored in the R4 register. When such an exception occurs under the left-side ADD instruction at the time of simultaneous: execution of the two instructions, the parallel operation control unit 646 inhibits the result of execution of the right-side OR instruction from being stored in the register, nullifies the execution of the right-side OR instruction, and holds the status of exceptional treatment.

The ADD instruction fetched from the left side of the 64-bit instruction data bus 622 is set in the first instruction register 641 and the OR instruction simultaneously fetched from the right side of the 64-bit instruction data bus 622 is set in the second instruction register 642. The first instruction decoder 644 decodes the OP code field 711 of the first instruction register 641 to detect that it is the arithmetic instruction (ADD instruction) and the second instruction decoder 645 decodes the OP code field 716 of the second instruction register 642 to detect that it is the arithmetic instruction (OR instruction).

Based on the detection above, the parallel operation control unit 646 perceives these two instructions to be those which can be executed in parallel.

The comparator 121 compares the destination field 712 of the first instruction register 641 with the first source field 718 of the second instruction register 642 to detect their mutual inconsistency. The comparator 132 compares the destination field 712 of the first instruction register 641 with the second source field 719 of the second instruction register 642 to detect their mutual inconsistency. Based on the detection above, the parallel operation control unit 646 perceives these two instructions to be those which can be executed in parallel.

In other words, the ADD instruction is intended to read the contents of the R1 register in accordance with the first source field 713 of the first instruction register 641 and the contents of the R2 register in accordance with the second source field 714 thereof. The arithmetic logic unit 651 is then used to calculate the sum of these two data and the result is stored in the R3 register indicated in the destination field 712. The arithmetic logic unit 651 is controlled by the first decoder 644 for decoding the OP code 711 of the first instruction register 641. An overflow is assumed to become occurred in the operations above.

The OR instruction is intended to read the contents of the R5 register in accordance with the first source field 718 of the second instruction register 642 and the contents of the R6 register in accordance with the second source field 719 of the second instruction register 642. The arithmetic logic unit 652 is used to calculate the OR between the two data. Incidentally, the arithmetic logic unit 652 is controlled by the second decoder 645 for decoding the OP code 716 of the second instruction register 642. The parallel operation control unit 646 detects the occurrence of an overflow exception in the left-side instruction (ADD instruction) and inhibits the result deriving from the arithmetic logic unit 651 from being stored in the register.

The address of the instruction in which an exception has occurred is saved as follows:

First, the instruction address accessed to the program memory 620 is set in a prefetch instruction address register 701. The address corresponds to the instruction address set in the prefetch instruction buffer 640. When the instruction is transferred from the prefetch instruction buffer 640 to the first instruction register 641 and the second instruction register 642, the address of the instruction is also set in an execution instruction address register 702 from the prefetch instruction address register. The instruction address set in the execution instruction address register 702 is what is set in the first instruction register 641, whereas the instruction address set in the second instruction register 642 is what is the value obtained by adding 4 to the execution instruction address register 702.

When an exception occurs during the execution of the instruction (ADD instruction) of the first instruction register 641, the parallel operation control unit 646 sets the value of the execution instruction address register 702 in an exception instruction address register 703. When an exception occurs during the execution of the instruction (OR instruction) of the second instruction register 642, the parallel operation control unit 646 adds 4 to the value of execution instruction address register 702 and sets the resulting value in the exception instruction address register 703.

When an exception occurs, the address of the instruction having the exception is saved in this embodiment and the processor executes a predetermined exception processing routine. The head address of the exception processing routine is predetermined and the value read from a ROM 705 in the processor. Instruction prefetching is carried out according to the address.

As the exception processing routine is prepared on the part of a user various processing methods are possible on a user basis. For instance, the user is informed of an exception occurrence address and a factor causing the exception on the one hand, and the user is made to terminate the program involved and to execute another one. In the case of FIG. 7(A), the value of EXPC 703 as an exception occurrence address is displayed and it is indicated that the exception factor was an arithmetic overflow.

Even though an exception occurs in one of the two instructions being simultaneously executed, the instruction address with the exception thus occurred and its processing status can be kept according to the present invention.

Figure 7B:
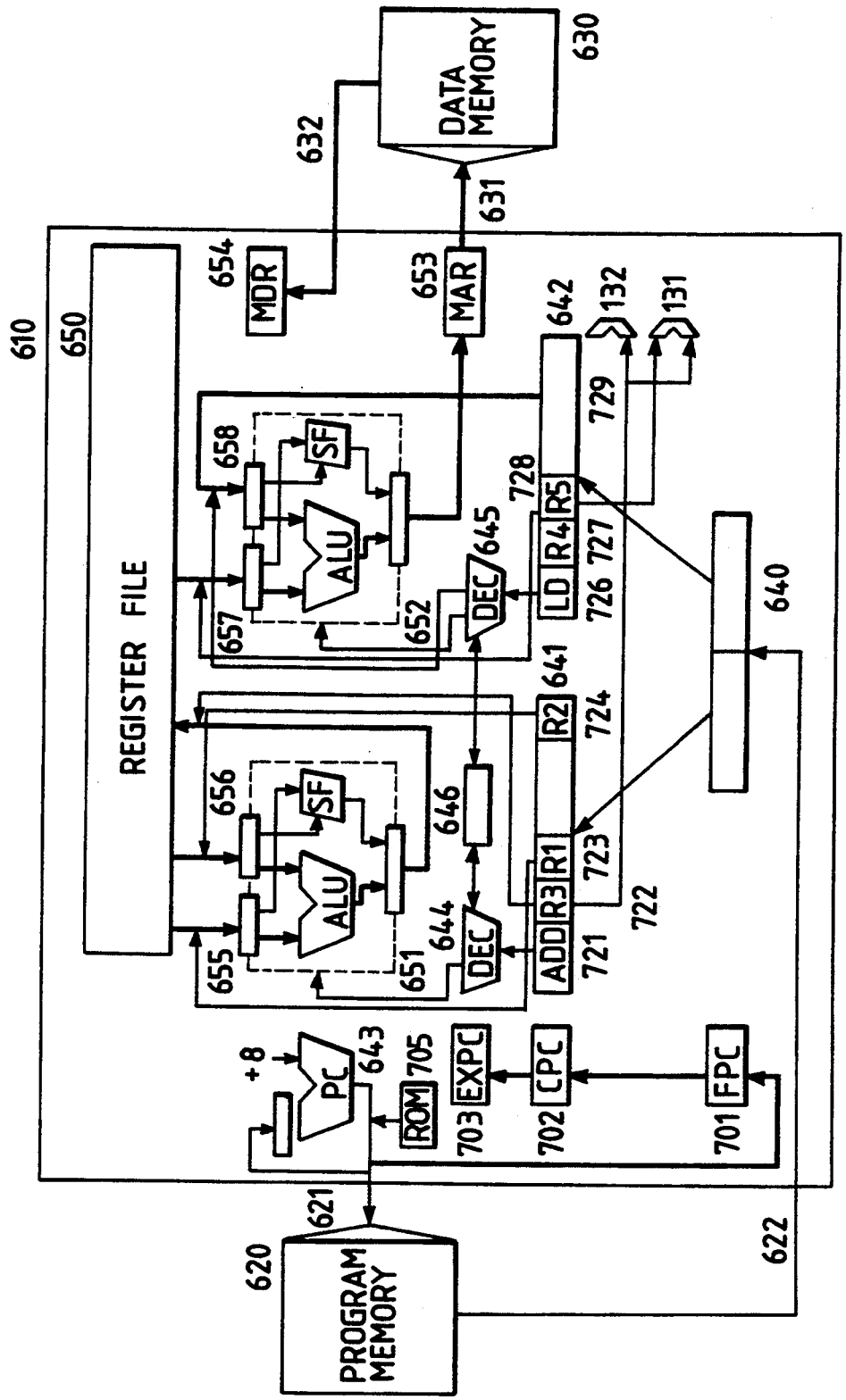

FIG. 7(B) is a diagram illustrating operations performed when an exception occurs in the right-side instruction during the simultaneous execution of two instructions. This is a case where the ADD instruction is fetched from the left side of the 64-bit instruction data bus 622 and the LD instruction is fetched from the right side thereof. The contents of R1 register and those of the R2 register are added up under the ADD instruction and the result is stored in the R3 register. The contents of the memory with the sum of the R5 register and the 16-bit immediate data as an address is fetched and the result is stored in the R4 register. During the execution of the two instructions according to the embodiment shown, the parallel operation control unit 646 stores the result of execution of the left-side ADD instruction when an exception occurs in the right-side LD instruction and keeps the status of the instruction at the time the exception occurs after completing the left-side ADD instruction processing.

The ADD instruction fetched from the left side of the 64-bit instruction data bus 622 is set in the first instruction register 641 and the LD instruction simultaneously fetched from the right side of the 64-bit instruction data bus 622 is set in the second instruction register 642. The first instruction decoder 644 decodes the OP code field 721 of the first instruction register 641 to detect that it is the arithmetic instruction (ADD instruction) and the second instruction decoder 645 decodes the OP code field 726 of the second instruction register 642 to detect that it is the memory-operation instruction (LD instruction).

Based on the detection above, the parallel operation control unit 646 finds these two instructions to be those of the sort that can be executed in parallel.

The comparator 131 compares the destination field 722 of the first instruction register 641 with the first source field 728 of the second instruction register 642 to detect their mutual inconsistency. The comparator 132 compares the destination field 722 of the first instruction register 641 with the second source field 729 of the second instruction register 642 to detect their mutual inconsistency. Based on the detection above, the parallel operation control unit 646 perceives these two instructions to be those which can be executed in parallel and executes them simultaneously.

In other words, the ADD instruction is intended to read the contents of the R1 register in accordance with the first source field 723 of the first instruction register 641 and the contents of the R2 register in accordance with the second source field 724 thereof. The arithmetic logic unit 651 is then used to calculate the sum of these two data and the result is stored in the R3 register indicated in the destination field 722. The arithmetic logic unit 651 is controlled by the first decoder 644 for decoding the OP code 721 of the first instruction register 641.

The LD instruction is intended to read the contents of the R5 register in accordance with the first source field 728 of the second instruction register 642 and to expand the 16-bit immediate data in the second source field 729 of the second instruction register 642 to 32 bits in code length. The arithmetic logic unit 652 is used to calculate the sum between the two data and controlled by the second decoder 645 for decoding the OP code 726 of the second instruction register 642; the data memory 630 being accessed with the sum as an address.

The address of the instruction in which an exception has occurred is saved as follows:

As an exception has occurred during the execution of the instruction (LD instruction) of the second instruction register 642, the parallel operation control unit 646 adds 4 to the value of the execution instruction address register 702 and sets the resulting value in exception instruction address register 703. Notwithstanding the description of the addition of 4 to the value of the execution instruction address register 702, it is only necessary to charge the third right-side bit from 0 to 1 as the value of the execution instruction address register 702 is actually kept at a multiple of 8. In other words, no operation is necessary to implement carry-over.

The processor carries out instruction prefetching with the value read from the ROM 705 as an address and implements a predetermined exception processing routine.

As in the case of FIG. 7(A), the contents of the exception processing routine indicate, for instance, the value of the EXPC 703 as an exception occurrence address, with a data bus access error (e.g., bus error) as an exception factor.

Even though an exception occurs in one of the two instructions being simultaneously executed, the instruction address with the exception thus occurred and its processing status can be kept according to the present invention.

As set forth above, the addresses of the first instruction register 641 and the second instruction register 642 can both be held in the one register 702, which makes register-saving in comparison with a case where the addresses of the first instruction register 641 and the second instruction register 642 are held in separate registers.

According to the embodiment shown, each instruction format is restrictive and this facilitates instruction decoding. Even though a double instruction decoder is mounted, the circuit scale may be reducible conspicuously.

As the OP code of the instruction for manipulating the immediate data differs by only one bit at the left end from the Op code of the instruction for controlling the register, the instruction decoder may be simplified according to the embodiment shown to the extent that the instruction decoding for creating the control signal of the arithmetic logic unit, for instance, is implemented commonly by either instruction.

As only one bit at the left end can be used to decide whether to manipulate the immediate data, the instruction decoder for generating a signal for controlling the immediate data creating circuit may be simplified.

As set forth above, it is possible to readily accomplish an instruction control system for simultaneously executing two instructions in consideration of how one instruction relies on another that precedes or follows according to the present invention.

Therefore, a data processor that can readily be materialized thereby offers processing performance twice as high as that of any conventional system at the peak time.

As the two instructions fetched in one cycle by using a bus having wide data can simultaneously be executed, the load between the pipeline stages is made uniform, whereby the hardware circuit becomes effectively utilizable according to the present invention.

As the kind of instruction that is executable in the instruction execution circuit for executing instructions in parallel is restricted on a circuit-to-circuit basis, the scale of the instruction execution circuit may be reducible according to the present invention.

When an instruction immediately following the branch instruction and the branch instruction are simultaneously executable, moreover, they are simultaneously executed according to the embodiment shown and another instruction is inhibited from being simultaneously executed in the delay slot. As a result, the execution of any conventional program as it can maintain compatibility without badly affecting another one.

What is claimed is:

1. A data processor capable of selective simultaneous parallel execution of at least two instructions following a branch instruction, the first instruction being a delay slot instruction, the data processor comprising:

an instructional fetch unit
for fetching from a memory unit a first delay slot instruction including a destination field and a second instruction following the first delay slot instruction including a source field, said first delay slot instruction being fetched from the memory immediately after said branch instruction is fetched into the data processor and
for outputting the first delay slot instruction and the second instruction in parallel;

a first instruction decoder having an input supplied with the first delay slot instruction output from the instruction fetch unit, the first instruction decoder decoding the first delay slot instruction and outputting a first result of said decoding;

a second instruction decoder having an input supplied with the second instruction output from the instruction fetch unit, the second instruction decoder decoding the second instruction and outputting a second result of said decoding;

a first instruction execution unit controlled according to the first result of said decoding in the first instruction decoder;

a second instruction execution unit controlled according to the second result of said decoding in the second instruction decoder;

a comparator for comparing data on the destination field of the first delay slot instruction output from the instruction fetch unit with data on the source field of the second instruction output from the instruction fetch unit, the comparator generating an output when the data of the destination field of the first delay slot instruction output from the instruction fetch unit matches the data of the source field of the second instruction output from the instruction fetch unit; and, a parallel operation control unit coupled with the first instruction decoder the second instruction decoder, the first instruction execution unit, the second instruction execution unit and the comparator, the parallel operation control unit generating a parallel operation inhibit signal when the branch instruction is taken; and, the parallel operation control unit i) nullifying the result of the decoding of the second instruction in the second instruction decoder so as to inhibit the execution of the second instruction in the second instruction execution unit when the preceding branch instruction is taken axed ii) activating the result of the decoding of the first delay slot instruction in tile first instruction decoder together with the results of the decoding of the second instruction in the second instruction decoder so as to carry out the parallel execution of the first delay slot instruction in the first instruction execution unit and the second instruction in the second instruction execution unit according to an absence of said parallel operation inhibits signal when the immediately preceding branch instruction is next taken and in an absence of said output from said comparator.

2. The data processor according to claim 1, wherein said processor further comprises a register file having a plurality of registers, and wherein when a register designated by the data on the destination field in the first delay slot instruction matches a register designated by the data on the source field in the second instruction, the output of the comparator inhibits the parallel execution of the first delay slot instruction and the second instruction in the first and the second instruction execution unit.

3. The data processor according to claim 1, wherein the instruction length of the first delay slot instruction and the second instruction is fixed having a predetermined bit length, and wherein said data processor is constructed for a reduced instruction set computer.

4. The data processor according to claim 2, wherein the instruction length of the first delay slot instruction and the second instruction is fixed having a predetermined bit length, and wherein said data processor is constructed for a reduced instruction set computer.

5. The data processor according to claim 1, wherein the memory is at least a one of a main memory and a cache memory.

6. A data processor according to claim 2, wherein the memory is at least a one of a main memory a cache memory.

7. A data processor according to claim 3, wherein the memory is at least a one of a main memory and a cache memory.

8. A data processor according claim 4, wherein the memory is at least a one of a main memory a cache memory.

9. The data processor according to claim 1, wherein said parallel operation control unit includes means for permitting the result of the decoding of the second instruction in the second instruction decoder so as to execute in parallel: i) the second instruction in the second instruction execution unit and ii) the first instruction in the first instruction execution unit, when the branch instruction is not taken.

* * * * *

UNITED STATES PATENT AND TRADEMARK OFFICE
CERTIFICATE OF CORRECTION

PATENT NO. : 5,381,531
DATED : January 10, 1995
INVENTOR(S) : Makoto Hanawa, et al.

It is certified that error appears in the above-indentified patent and that said Letters Patent is hereby corrected as shown below:

On the title page, in item [54], and in column 1.
In line 4 of the title, after "INSTRUCTION" insert --,--.

Claim 1, column 28, line 10, delete "instructional" and substitute therefor --instruction--;
    line 58, delete "axed" and substitute therefor --and--;
    line 60, delete "tile" and substitute therefor --the--;
    line 67, delete "inhibits" and substitute therefor --inhibit--; and,
  column 29, line 1, delete "next" and substitute therefor --not--.

Claim 8, column 30, line 13, after "main memory" insert --and--.

Signed and Sealed this

Twenty-eight Day of March, 1995

Attest:

BRUCE LEHMAN

*Attesting Officer*     *Commissioner of Patents and Trademarks*